(12) United States Patent
Yano et al.

(10) Patent No.: US 7,562,734 B2
(45) Date of Patent: Jul. 21, 2009

(54) LUGGAGE STORAGE DEVICE FOR A MOTORCYCLE

(75) Inventors: Kengo Yano, Wako (JP); Fuminori Kamemizu, Wako (JP); Sadamichi Enjo, Wako (JP); Junji Kikuno, Wako (JP); Tsutomu Takeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 648 days.

(21) Appl. No.: 10/969,296

(22) Filed: Oct. 6, 2004

(65) Prior Publication Data

US 2005/0098596 A1 May 12, 2005

(30) Foreign Application Priority Data

Oct. 10, 2003 (JP) ............................. 2003-352966

(51) Int. Cl.
*B62D 61/02* (2006.01)
*B62J 9/00* (2006.01)

(52) U.S. Cl. .................. 180/219; 224/413; 224/427

(58) Field of Classification Search ............... 224/413, 224/427, 433; 180/219, 227, 69.4; 280/833, 280/202, 288.4; 297/78.1; 296/78.1, 37.1
See application file for complete search history.

(56) References Cited

U.S. PATENT DOCUMENTS

| | | | |
|---|---|---|---|
| 4,413,700 A * | 11/1983 | Shiratsuchi | 180/219 |
| 4,871,041 A | 10/1989 | Saito et al. | |
| 4,907,428 A | 3/1990 | Nakashima et al. | |
| 4,915,188 A | 4/1990 | Ota et al. | |
| 4,964,483 A * | 10/1990 | Yokoyama et al. | 180/219 |
| 5,040,632 A * | 8/1991 | Fujii et al. | 180/219 |
| 5,107,949 A * | 4/1992 | Gotoh et al. | 180/219 |
| 5,291,067 A | 3/1994 | Nakajima et al. | |
| 5,433,286 A * | 7/1995 | Kumamaru et al. | 180/219 |
| 5,533,783 A | 7/1996 | Harms et al. | |

(Continued)

FOREIGN PATENT DOCUMENTS

EP 0 463 942 B1 1/1992

(Continued)

OTHER PUBLICATIONS

English translation of Office Action issued by the German Patent Office Jun. 12, 2008.

(Continued)

*Primary Examiner*—Anne Marie Boehler
(74) *Attorney, Agent, or Firm*—Hamre, Schumann, Mueller & Larson, P.C.

(57) ABSTRACT

The present invention relates to a luggage storage device for a motorcycle. In an embodiment, the invention can allow the capacity of a storage box to be large enough to accommodate long goods therein. In an embodiment, the invention includes a storage box having a front helmet storage portion and a rear helmet storage portion. The front helmet storage portion is disposed under a front seat. The rear helmet storage portion is disposed under a rear seat, which together with the front seat, constitutes a tandem type riding seat. The storage box is disposed under the riding seat so as to extend from under a front end of the riding seat up to near an upper portion of a rear cushion that suspends a rear wheel from a rear portion of a vehicle body frame.

12 Claims, 20 Drawing Sheets

U.S. PATENT DOCUMENTS

| | | | |
|---|---|---|---|
| 6,073,719 A * | 6/2000 | Ohmika et al. | 180/219 |
| 6,249,744 B1 | 6/2001 | Morita | |
| 6,499,784 B2 * | 12/2002 | Takahashi | 296/37.1 |
| 6,758,296 B2 * | 7/2004 | Inaoka et al. | 180/228 |
| 7,004,149 B2 * | 2/2006 | Yashiro | 123/494 |
| 7,028,800 B2 * | 4/2006 | Yagisawa et al. | 180/219 |
| 7,198,129 B2 * | 4/2007 | Sakaki et al. | 180/219 |
| 2001/0007293 A1 * | 7/2001 | Yamauchi | 180/219 |
| 2002/0189877 A1 | 12/2002 | Yagisawa et al. | |
| 2003/0222473 A1 | 12/2003 | Yamamoto et al. | |

FOREIGN PATENT DOCUMENTS

| | | |
|---|---|---|
| EP | 0800988 | 10/1997 |
| EP | 0856462 | 5/1998 |
| EP | 0825101 | 12/1998 |
| EP | 1520968 | 4/2005 |
| FR | 2802889 | 6/2001 |
| JP | 1-148679 A | 6/1989 |
| JP | 4-362486 * | 12/1992 |
| JP | 5-278658 * | 10/1993 |
| JP | 6-32269 * | 2/1994 |
| JP | 9-11952 | 1/1997 |
| JP | 10001079 | 1/1998 |
| JP | 10-297566 A | 11/1998 |
| JP | 63-170392 U | 11/1998 |
| JP | 11-227658 | 8/1999 |
| JP | 2001-63657 | 3/2001 |
| JP | 180565 | 6/2001 |
| JP | 2001-260968 | 9/2001 |
| JP | 2001-278154 | 10/2001 |
| JP | 2002-284062 A | 10/2002 |
| JP | 2003-182667 A | 7/2003 |
| JP | 2003-226280 A | 8/2003 |
| JP | 2003-285692 | 10/2003 |
| JP | 2003-285786 A | 10/2003 |

OTHER PUBLICATIONS

Office Action issued by the Japanese Patent Office in corresponding Japanese Application No. 2003-352966 on Nov. 19, 2008.

* cited by examiner

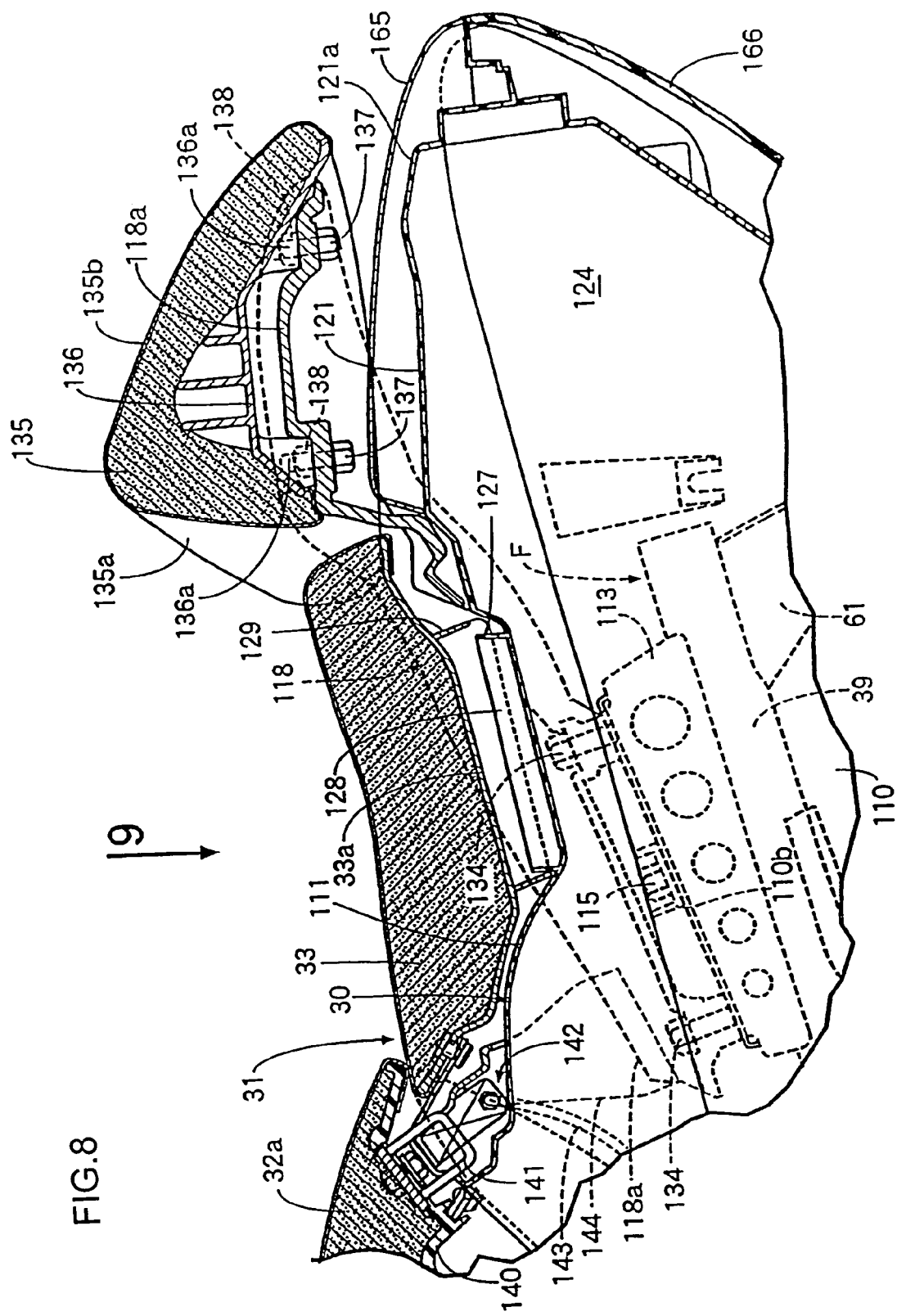

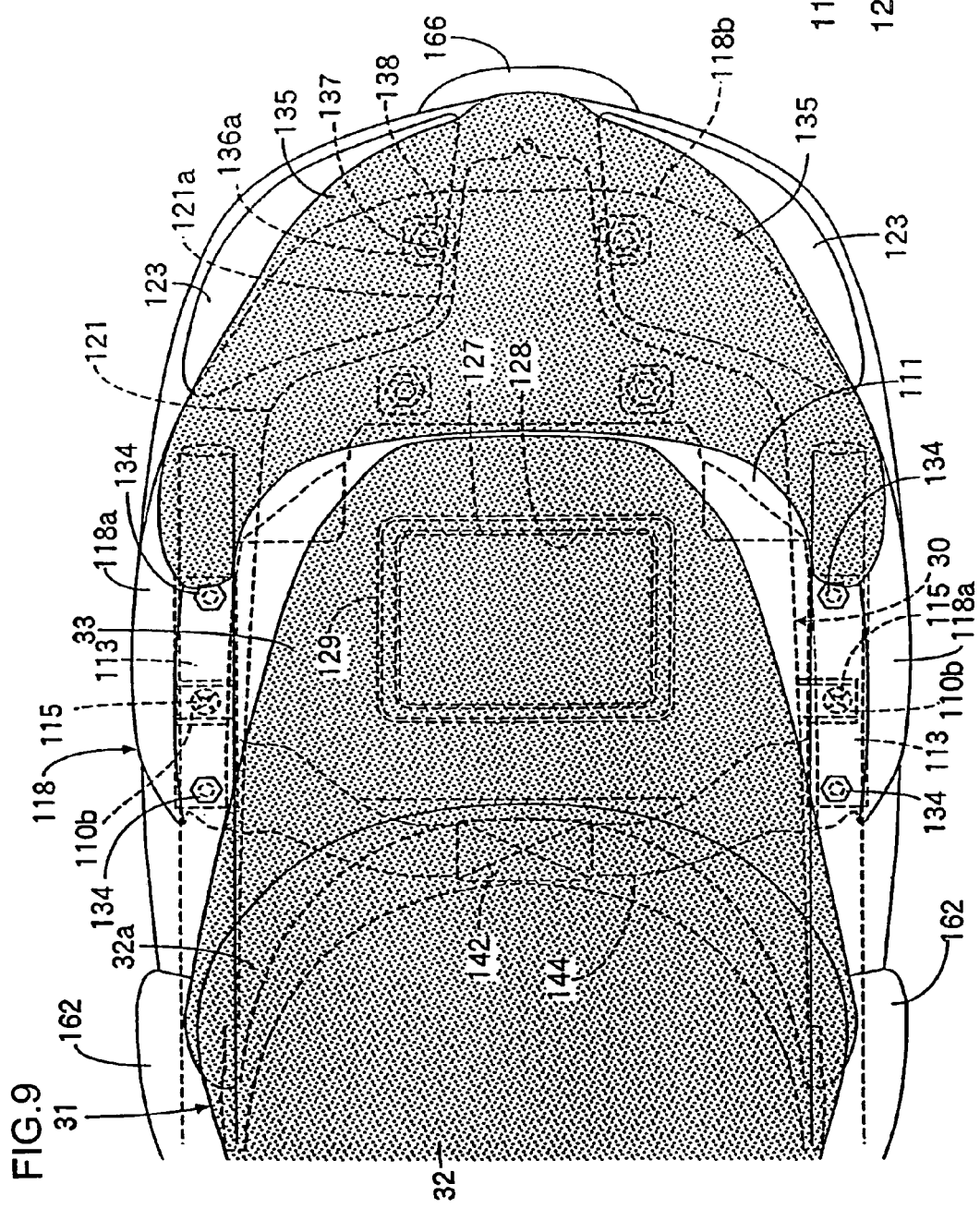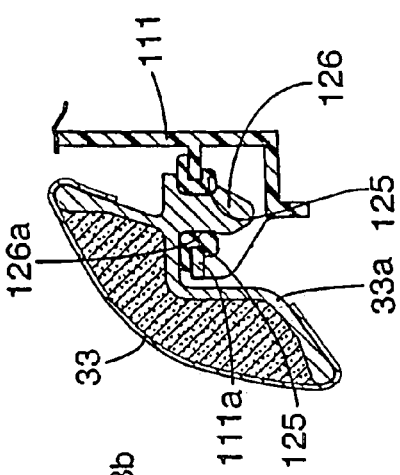

US 7,562,734 B2

LUGGAGE STORAGE DEVICE FOR A MOTORCYCLE

FIELD OF THE INVENTION

The present invention relates to a luggage storage device for a motorcycle.

BACKGROUND OF THE INVENTION

In conventional luggage storage devices, a rear end of a storage box is located ahead of a rear end of a rear seat. In such a configuration, a space for accommodating goods other than a helmet in a rear portion of the storage box is difficult to be ensured. For example, long goods expanded backward with respect to a rear end of a riding seat cannot be accommodated within the storage box. Japanese Patent Laid-open No. 2001-63657 discloses such a luggage storage device for a motorcycle.

In the above conventional luggage storage device, since a rear portion of a fuel tank is located under a front portion of the storage box, it is inevitably required that the front portion of the storage box be made shallow. Consequently, the capacity of the storage box is relatively small, and it is difficult to accommodate long goods within the storage box.

SUMMARY OF THE INVENTION

The present invention is concerned with a luggage storage device for a motorcycle. In an embodiment, the invention includes a storage box having a front helmet storage portion and a rear helmet storage portion. The front helmet storage portion is disposed under a front seat. The rear helmet storage portion is disposed under a rear seat, which together with the front seat, constitutes a tandem type riding seat. The storage box is disposed under the riding seat so as to extend from under a front end of the riding seat up to near an upper portion of a rear cushion that suspends a rear wheel from a rear portion of a vehicle body frame.

BRIEF DESCRIPTION OF THE DRAWINGS

FIG. 8 is a longitudinal sectional view of a rear portion of the storage box and the vicinity thereof.

FIG. 9 is a view as seen in the direction of arrow 9 in FIG. 8.

FIG. 10 is an enlarged sectional view taken along line 10-10 in FIG. 1.

DETAILED DESCRIPTION OF THE INVENTION

Figure 1:
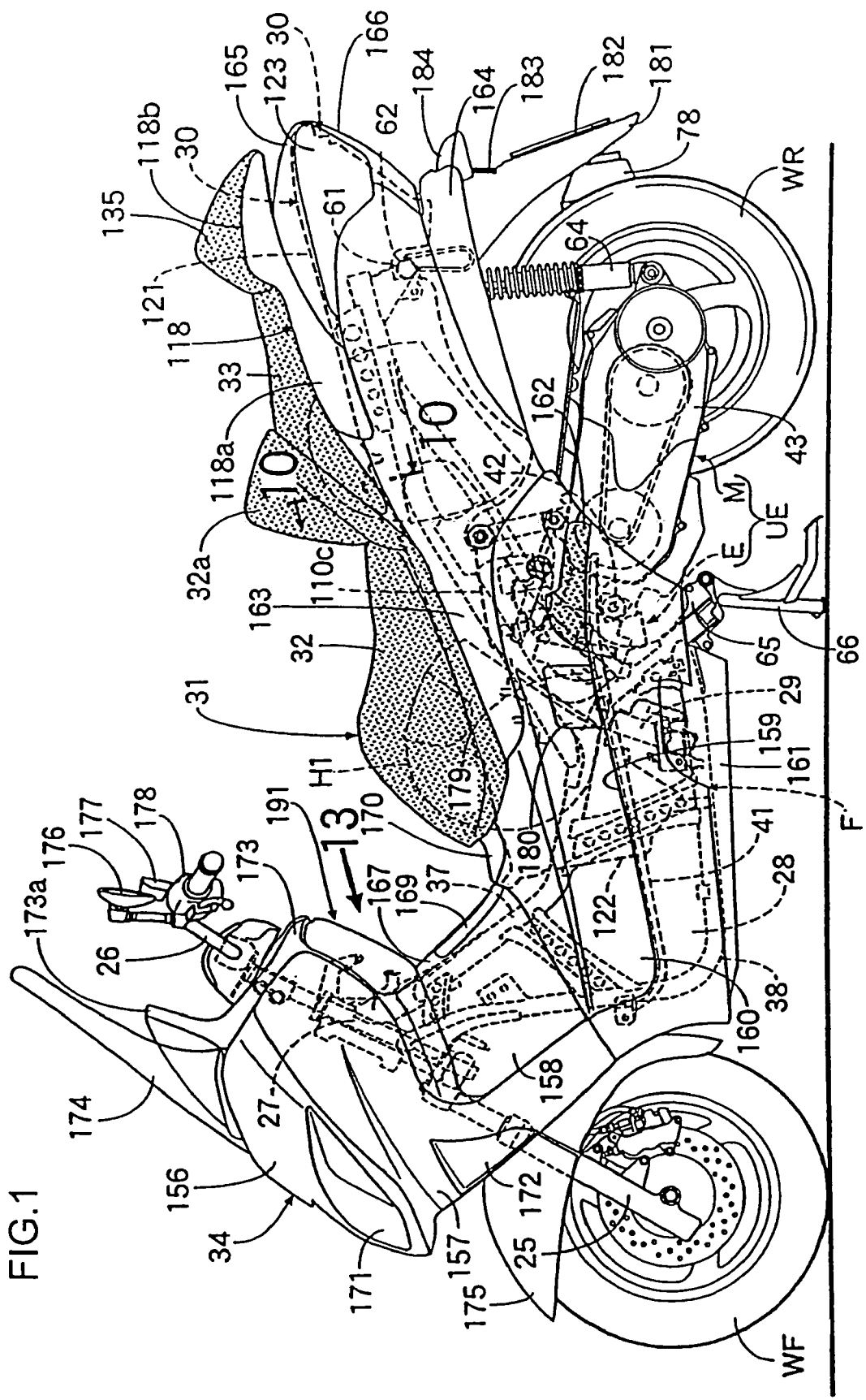
FIG. 1 is a left side view of a scooter type vehicle.

In an embodiment, the invention provides a luggage storage device for a motorcycle wherein the capacity of a storage box can be set large and long goods can be accommodated within the storage box.

In an embodiment, the invention provides a luggage storage device for a motorcycle in which a storage box having a front helmet storage portion disposed under a front seat and a rear helmet storage portion disposed under a rear seat is disposed under the riding seat so as to extend from under a front end of the riding seat up to near an upper portion of a rear cushion which suspends a rear wheel from a rear portion of a vehicle body frame. A rear expanded portion, expanded backward beyond a rear end of the rear seat, is provided in a rear portion of the storage box.

Since the rear expanded portion is provided in the rear portion of the storage box, the capacity of the storage box can be increased to the extent that long goods such as golf clubs extending backward beyond the rear end of the riding seat can be accommodated within the storage box. Besides, small goods other than helmet can be accommodated in the rear portion of the storage box, and small goods that are seldom used, such as tools, can be accommodated within the rear portion of the storage box.

The rear expanded portion can be expanded backward up to approximately the same position as a rear end of a grab rail disposed around the rear seat. The capacity of the storage box can be increased and the rear portion of the storage box can be protected by the grab rail.

In an embodiment, a narrow portion which gets into between right and left tail light units in top view can be provided in a rear portion of the rear expanded portion.

The capacity of the storage box can be increased by effectively utilizing the space formed between the pair of right and left tail light units, and it becomes easier to form a space for replacement of bulbs of the tail lights.

The storage box can have an upper cover disposed under the rear seat, and a storage space capable of being utilized upon removal of the rear seat can be formed on an upper surface of the upper cover. A space for accommodating small goods can be ensured in a place other than the interior of the storage box while preventing an increase in the number of parts and preventing the structure from becoming complicated.

In an embodiment, the storage space is formed within a first rib. The first rib can be erected on the upper cover and extending in an endless manner. A second rib which extends in an endless manner so as to form a labyrinth structure in cooperation with the first rib can be suspended from a bottom plate of the rear seat. The entry of rain water and dust into the storage space from the exterior can be prevented by a simple structure.

A lighting unit for lighting the interior of the storage box can be attached to an inner side face of the storage box at a portion corresponding to a front portion of the upper cover. The interior of the rear portion of the storage box which is apt to become dark in the presence of the upper cover can be lit effectively without being obstructed by the goods accommodated in the interior of the storage box. Besides, in the portion corresponding to the front portion of the upper cover, the inner side face of the storage box is easy to be seen, so that burned-out bulb of a lighting unit can be found out easily.

In an embodiment, cover members which constitute a part of a vehicle body cover and cover the rear expanded portion, a pair of right and left tail light units, and a rear fender, are attached to the rear expanded portion.

Plural members arranged around the rear portion of the storage box can be removed at a time by only removing the wiring of the tail light units. Thus, an excellent maintenance property can be attained.

The storage box can have a shallow portion located between the front helmet storage portion and the rear helmet storage portion, and a throttle body with a control box attached thereto, the control box containing a controller, and a fuel injection valve can be disposed under the shallow portion in such a manner that respective upper ends are substantially flush with each other.

The front and rear helmet storage portions in the storage box are shallow, and by forming the shallow portions flat, the flat shallow portions can be utilized effectively as containers. Besides, a part of the engine intake system can be disposed effectively in the space under the shallow portions.

In an embodiment, the invention provides a luggage storage device for a motorcycle in which a storage box having a front helmet storage portion disposed under a front seat and a rear helmet storage portion disposed under a rear seat which constitutes a tandem type riding seat together with the front seat is disposed under the riding seat so as to extend from under a front end of the riding seat up to near an upper portion of a rear cushion which suspends a rear wheel from a rear portion of a vehicle body frame. A rear expanded portion expanded backward beyond an upper mounting portion of the rear cushion for mounting to the rear portion of the vehicle body frame can be provided in a rear portion of the storage box.

Since the rear expanded portion is provided in the rear portion of the storage box, the capacity of the storage box can be increased to the extent that long goods such as golf clubs extending backward beyond the rear end of the riding seat can be accommodated within the storage box. Besides, small goods other than helmet can be accommodated in the rear portion of the storage box, and small goods which are seldom used, such as tools, can be accommodated in the rear portion of the storage box.

A lower portion of the rear expanded portion can be disposed lower than the upper mounting portion of the rear cushion for mounting to the rear portion of the vehicle body frame in such a manner that a raised portion being formed by raising a bottom wall of the storage box partially upwards can be interposed between a container portion, and the rear helmet storage portion and the container portion can be formed within the rear expanded portion.

The rear portion of the bottom wall of the storage box can be partially raised correspondingly to the mounting portion of the upper portion of the rear cushion for mounting to the vehicle body frame to form a raised portion, and the rear helmet storage portion and the container portion located behind the rear helmet storage portion are partitioned from each other by the raised portion. With this construction, not only the easiness of use is ensured, but also longitudinal movements of the small goods accommodated within the rear container portion can be prevented by the raised portion.

In an embodiment, the present invention provides a luggage storage device for a motorcycle in which a storage box having a front helmet storage portion disposed under a front seat and a rear helmet storage portion disposed under a rear seat which constitutes a tandem type riding seat together with the front seat is disposed under the riding seat so as to extend from under a front end of the riding seat up to near an upper portion of a rear cushion which suspends a rear wheel from a rear portion of a vehicle body frame. A fuel tank formed vertically long in side view is disposed in front of the storage box, and a front expanded portion expanded forward up to near a bottom of the fuel tank is provided in a lower portion of a front end of the storage box.

Since the front expanded portion is provided in the front portion of the storage box, the front portion of the storage box can be formed deep to facilitate accommodation of long goods and the capacity of the storage box can be increased.

Electric appliances can be accommodated within the front expanded portion. Electric appliances can be accommodated within the storage box without obstructing the accommodation of helmet and the like.

A maintenance lid which provides a partition between the interior of the front expanded portion and the front helmet storage portion overlying the front expanded portion can be openably attached to the storage box. The front helmet storage portion and the interior of the front expanded portion can be partitioned from each other and therefore it is possible to prevent mutual contact and damage of the goods accommodated in the front expanded portion and the helmet accommodated in the front helmet storage portion.

In an embodiment, a lower portion of a damper rod extending vertically to assist opening and closing operations of the front seat can be accommodated within the front expanded portion. A damper rod disposing space need not be ensured outside the storage box. Besides, when the front seat is opened, exposure of the damper rod to the exterior is avoided as far as possible so as not to obstruct putting goods into the storage box, whereby it is possible to improve appearance and style.

Referring now to FIG. 1, a vehicle body frame F of a scooter type vehicle as a motorcycle is provided at a front end thereof with a head pipe 27. The head pipe 27 steerably supports a front fork 25 and a steering handle 26 connected to the front fork 25. The front fork 25 supports a front wheel WF through an axle. A unit swing engine UE which supports a rear wheel WR at a rear end thereof is supported vertically swingably at a longitudinally intermediate portion of the body frame F. A fuel tank 28 and a radiator 29 are mounted on the vehicle body frame F ahead of the unit swing engine UE. The fuel tank 28 is formed vertically long in side view, and the radiator 29 is disposed behind the fuel tank 28. A storage box 30 is secured to the vehicle body frame F so as to cover the unit swing engine UE from above. A tandem type riding seat 31 having a front seat 32 and a rear seat 33 is disposed on the storage box 30. Further, a vehicle body cover 34 made of a synthetic resin, which covers the vehicle body frame F, a front portion of the unit swing engine UE, the fuel tank 28, the radiator 29, and the storage box 30, is secured to the vehicle body frame F.

Figure 2:
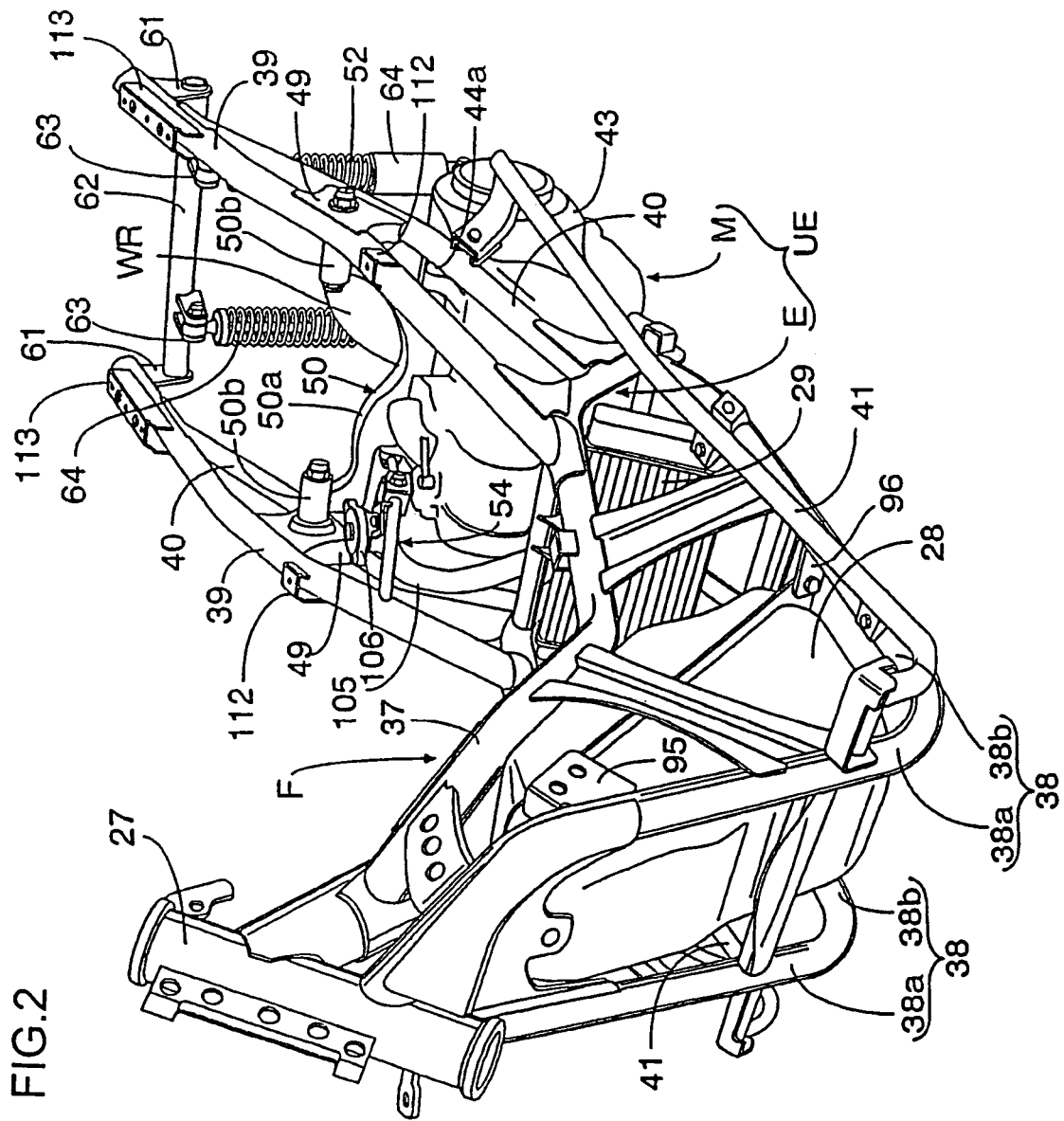
FIG. 2 is a perspective view of a vehicle body frame with both fuel tank and radiator mounted thereto.
Figure 3:
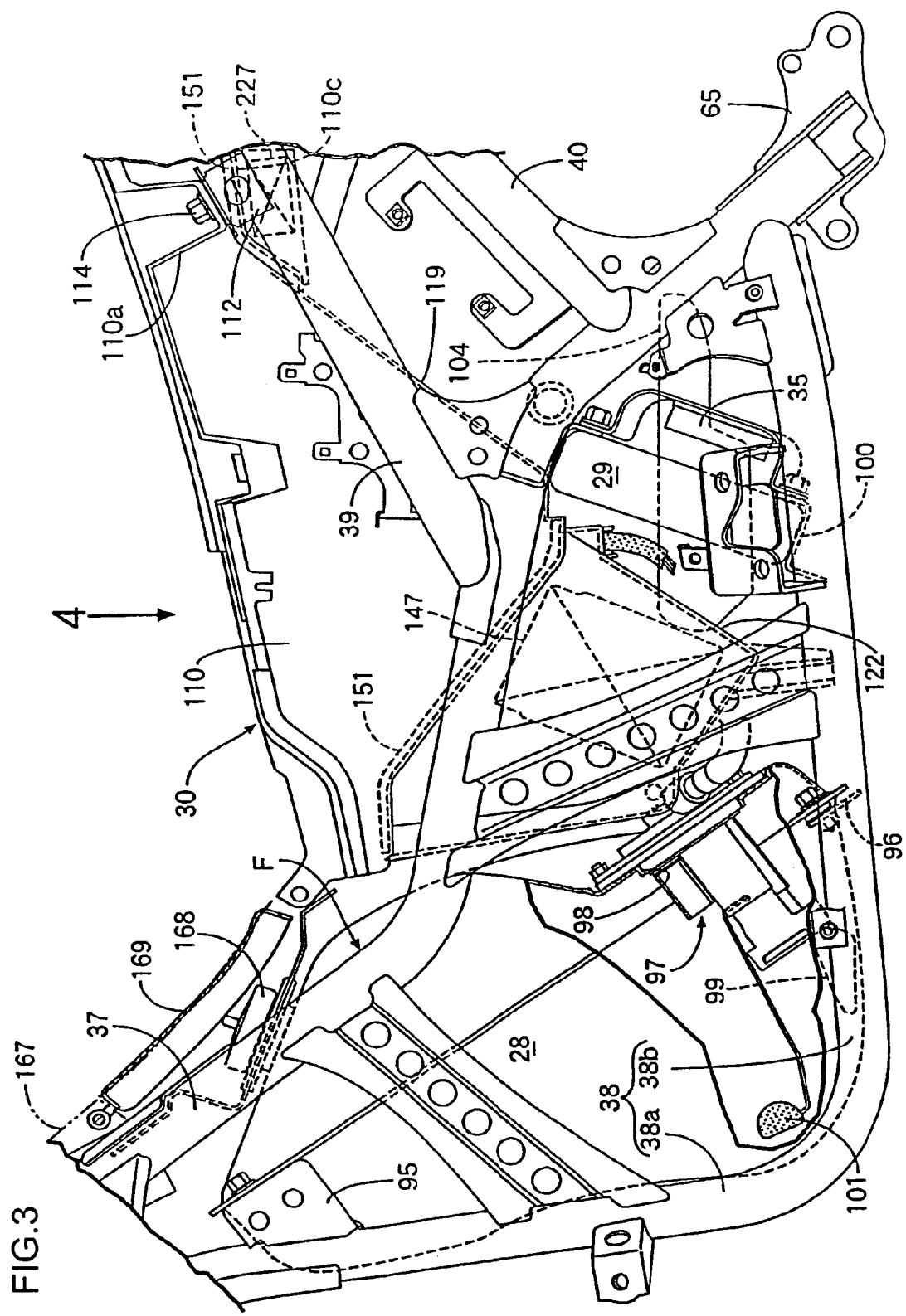
FIG. 3 is a left side view of a longitudinally intermediate portion of the scooter type vehicle with both riding seat and vehicle body cover removed.

Referring now to FIGS. 2 and 3, the vehicle body frame F includes the head pipe 27, a pair of right and left upper down-frames 37 connected to the head pipe 27 and extending backwardly downward, and a pair of right and left lower down-frames 38 whose rear ends are welded to rear ends of the upper down-frames 37. The lower down-frames 38 have respective inclined portions 38a and horizontal portions 38b. The inclined portions 38a are connected to the head pipe 27 below the upper down-frames 37 and extending backwardly downward. The horizontal portions 38b are connected to rear ends of the inclined portions 38a. Further, the body frame F includes a pair of right and left seat rails 39, a pair of right and left rear frames 40, and a pair of right and left support frames 41. The seat rails 39 extend backwardly upward from intermediate portions of both upper down-frames 37. The rear frames 40 connect between rear portions of the upper down-frames 37 and rear portions of the seat rails 39. The support frames 41 are disposed laterally outside the upper down-frames 37, lower down-frames 38, and rear frames 40 and extend longitudinally.

Both support frames 41 support right and left step floors 159 of the vehicle body cover 34 from below. Front ends of both support frames 41 are connected to lower portions of the inclined portions 38a of the lower down-frames 38, while rear ends of both support frames 41 are connected to intermediate portions of the rear frames 40.

Figure 4:
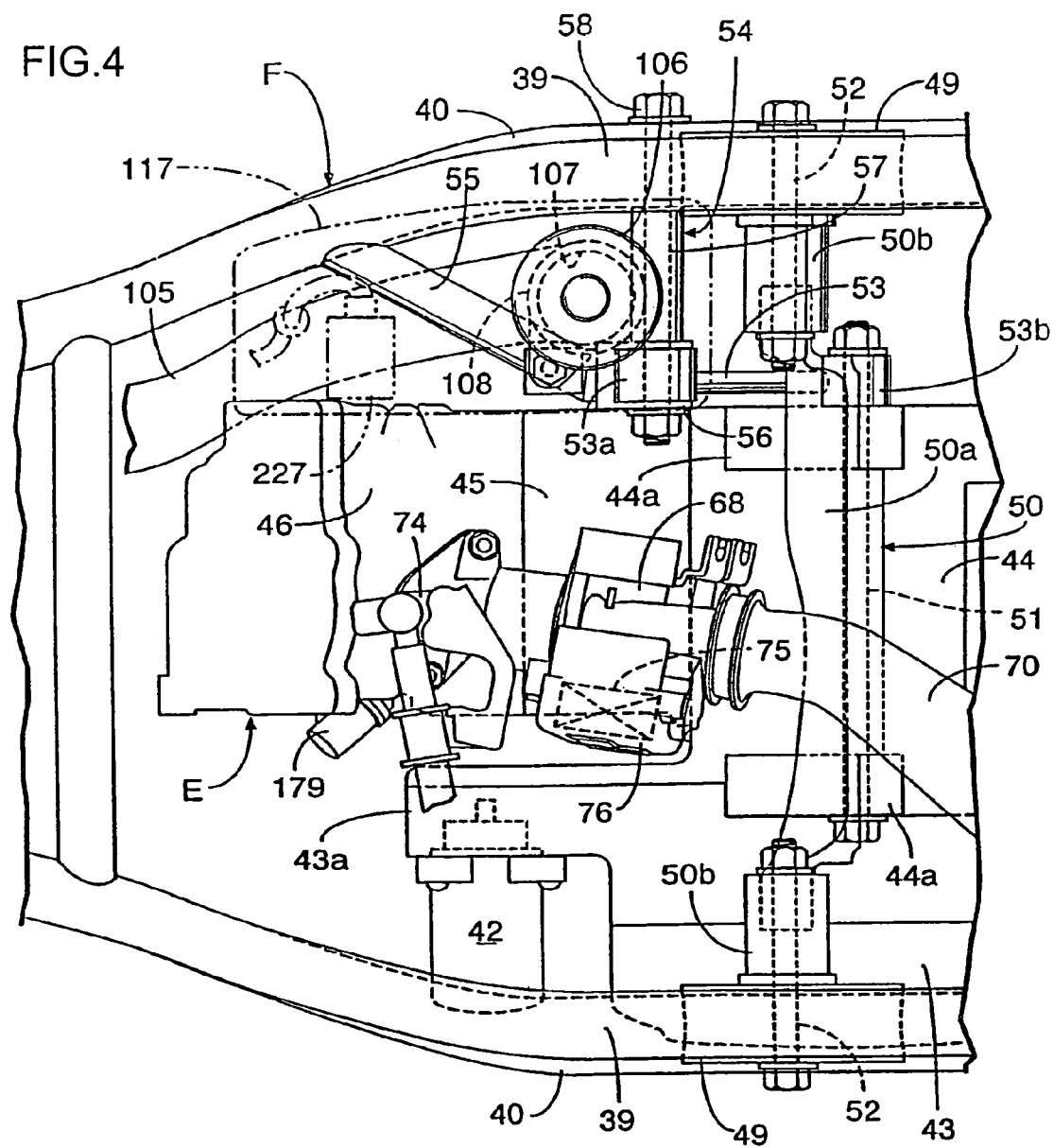
FIG. 4 is a view as seen in the direction of arrow 4 in FIG. 3 with a storage box removed.
Figure 5:
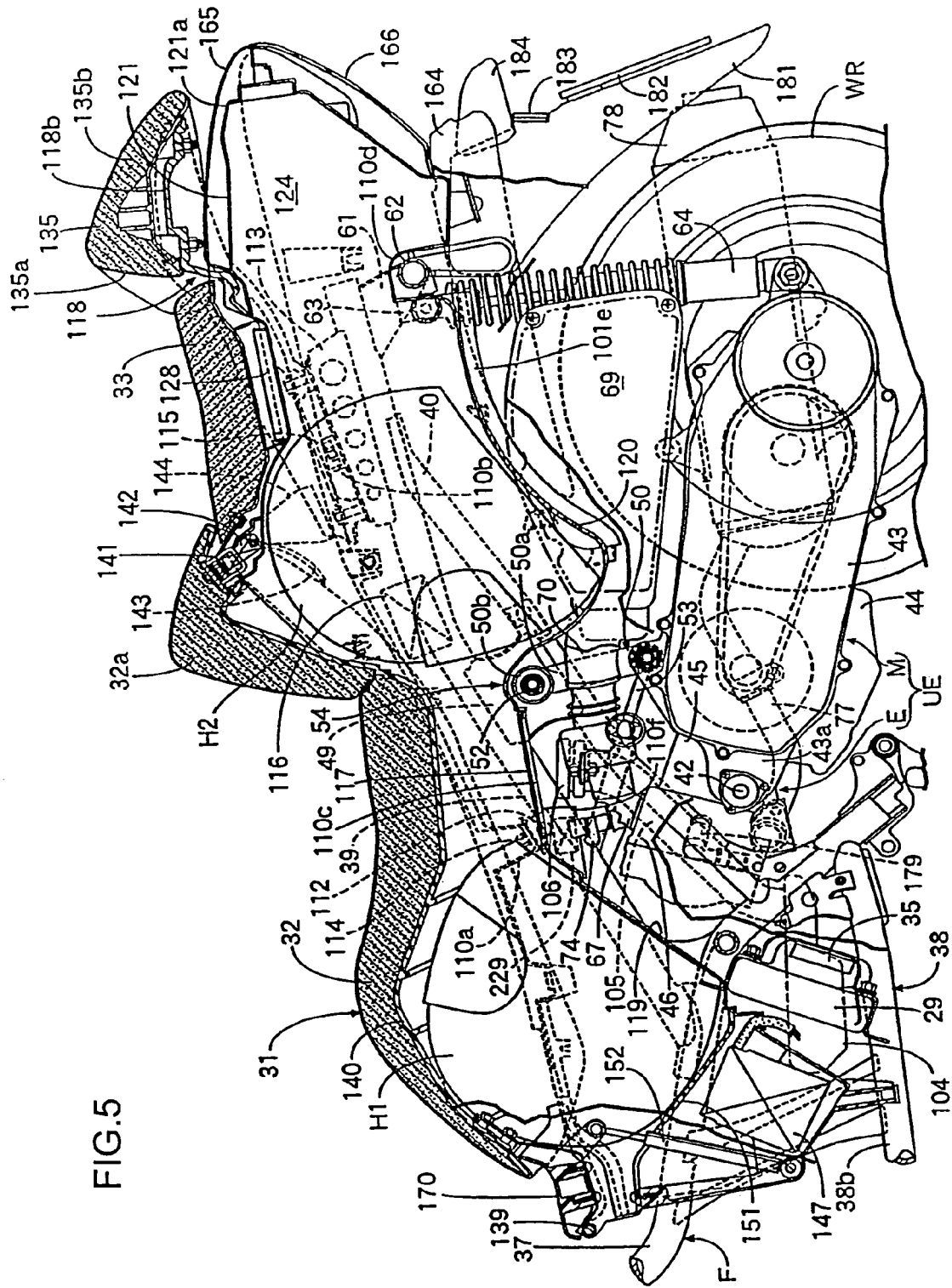
FIG. 5 is an enlarged side view in longitudinal section of a rear portion of the scooter type vehicle.
Figure 6:
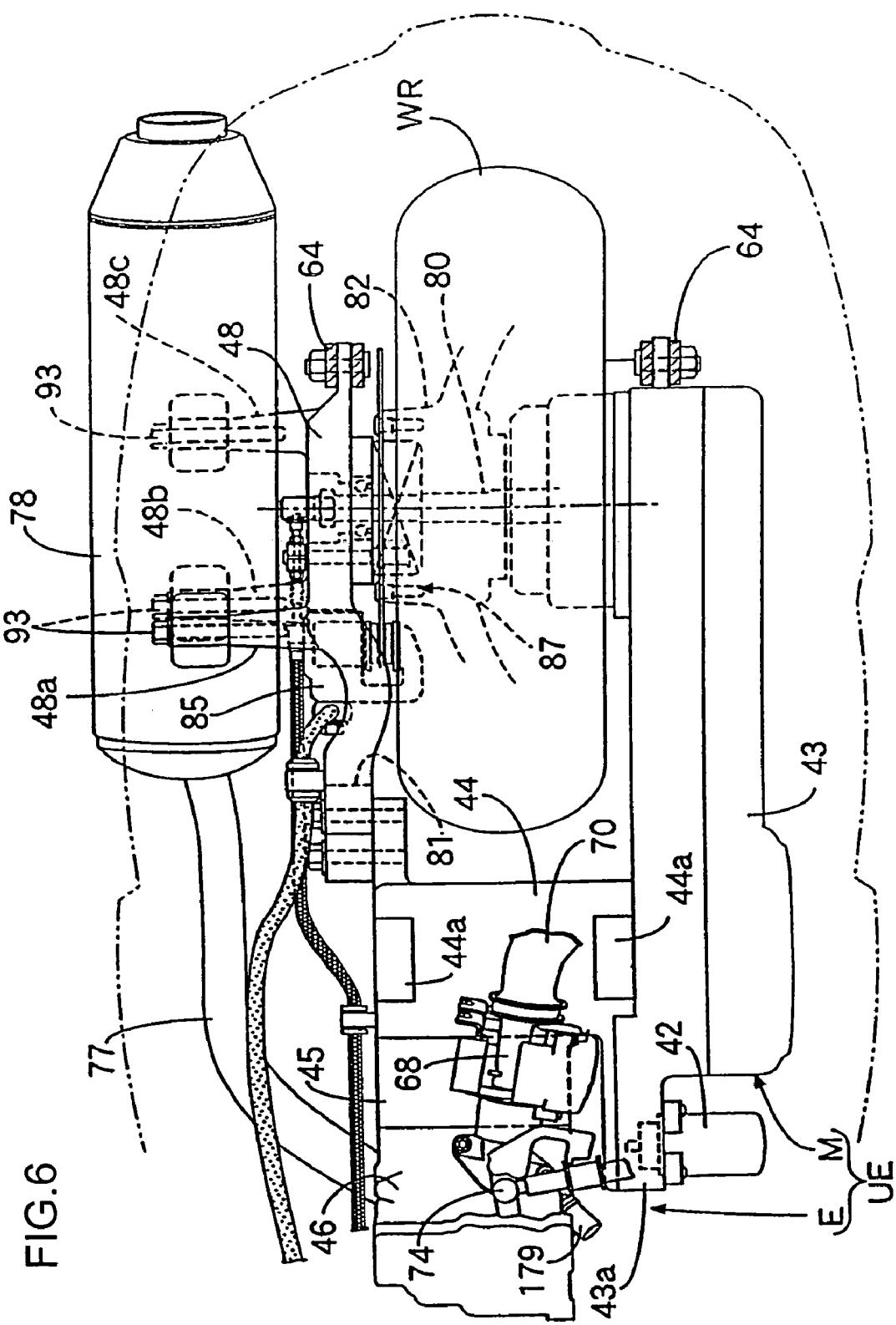
FIG. 6 illustrates relative arrangement of a unit swing engine and a rear wheel.

Referring now to FIGS. 4 to 6, the unit swing engine UE is made up of a water-cooled engine E and a continuously variable transmission M. The engine E has a cylinder axis which is substantially horizontal. The continuously variable transmission M changes the engine speed outputted from the engine E steplessly through transfer belt and pulley and transmits the changed speed to a rear wheel WR. The continuously variable transmission M drives a crank shaft-side movable pulley in accordance with operation of an electric motor 42 for speed change and causes the gear ratio to be changed steplessly.

A transmission case 43 of the continuously variable transmission M is contiguous to the engine E so as to project to the left side of a crank case 44 in the engine E and is extended up to the left side of the rear wheel WR. A front end portion of a swing arm 48 is connected to the right side of the crank case 44, and the rear wheel WR is supported through an axle between a rear end portion of the transmission case 43 and that of the swing arm 48.

The electric motor 42 for speed change is disposed ahead of the continuously variable transmission M and on the left side of a cylinder 45 in the engine E. The electric motor 42 is secured to a front projecting portion 43a of the transmission case 43 with a rotational axis thereof facing in the transverse direction of the vehicle body. Besides, the electric motor 42 is positioned lower than a left passenger step 162 out of a pair of right and left passenger steps 162 provided in the vehicle body cover 34 and is positioned, in side view, lower than the left support frame 41 out of both support frames 41 which constitute a part of the vehicle body frame F.

A pair of brackets 49 are provided between intermediate portions of the seat rails 39 and intermediate portions of the rear frames 40 in the vehicle body frame F. A pair of support lugs 44a are formed on an upper surface of the crank case 44 in the engine E. A link 50 includes a link tube portion 50a and a pair of cylindrical support tube portion 50b provided coaxially and integrally at both ends of the link tube portion 50a. Both support lugs 44a and the link tube portion 50a are connected together through a connecting shaft 51 which is a bolt. The support tubes 50b provided at both ends of the link 50 are supported pivotably by the bracket 49 through a pair of pivot shafts 52 which are parallel to the connecting shaft 51.

That is, the unit swing engine UE is supported by the vehicle body frame F swingably around the axes of both pivot shafts 52.

A tension rod 53 is provided between the engine E and the vehicle body frame F. Ring-like connecting portions 53a and 53b are provided at both ends of the tension rod 53. The connecting portion 53a provided at one end of the tension rod 53 is connected pivotably to a mounting portion 54 which is provided on the right seat rail 39 and rear frame 40 of the vehicle body frame F. The connecting portion 53b provided at the other end of the tension rod 53 is connected pivotably to the right end of the connecting shaft 51 which connects the crank case 44 to the link 50.

The mounting portion 54 includes a support tube 55, a bracket 56, and a connecting tube 57. The support tube 55 extends backwardly downward and obliquely from a front portion of the right seat rail 39. The bracket 56 is a generally U shape open backward and is fixed to a rear end of the support cylinder 55. The connecting tube 57 connects between the right rear frame 40 and the bracket 56. The connecting portion 53a at one end of the tension rod 53 is supported by the mounting portion 54 pivotably through a bolt 58. The bolt 58 is fixed to the vehicle body frame F so as to be inserted through the bracket 56 and the connecting tube 57.

A pair of downwardly depending support plates 61 are fixed to rear ends of both seat rails 39 in the vehicle body frame F, and a support pipe 62 as a mounting portion is disposed bridgewise between both support plates 61. A pair of brackets 63 are provided on the support pipe 62 and upper ends of a pair of rear cushions 64 are connected to the brackets 63 respectively. Lower ends of both rear cushions 64 are connected to the rear ends of the transmission case 43 and the swing arm 48.

A pair of brackets 65 are attached to the rear ends, i.e., lower ends, of both upper down-frames 37, and a main stand 66 is supported pivotably by both brackets 65. When the main stand 66 is allowed to stand up, the scooter type vehicle can be allowed to stand by itself in a floating state of the rear wheel WR, as shown in FIG. 1. For travel of the scooter type vehicle, the main stand 66 may be stowed to let the rear wheel WR contact the ground.

A downstream end of a throttle body 68 is connected through an intake pipe 67 to an upper surface of a cylinder head 46 in the engine E. The intake pipe 67 is curved backward from the cylinder head 46. An upstream end of the throttle body 68 is connected through a connecting pipe 70 to an air cleaner 69 disposed above the continuously variable transmission M in the unit swing engine UE. The connecting pipe 70 extends above the link tube portion 50a of the link 50.

A fuel injection valve 74 is attached to the intake pipe 67, and a control box 76 is attached to the throttle body 68. The control box 76 houses therein a controller 75 for controlling the ignition timing of the engine E and the fuel injection quantity in the fuel injection valve 74.

Figure 7:
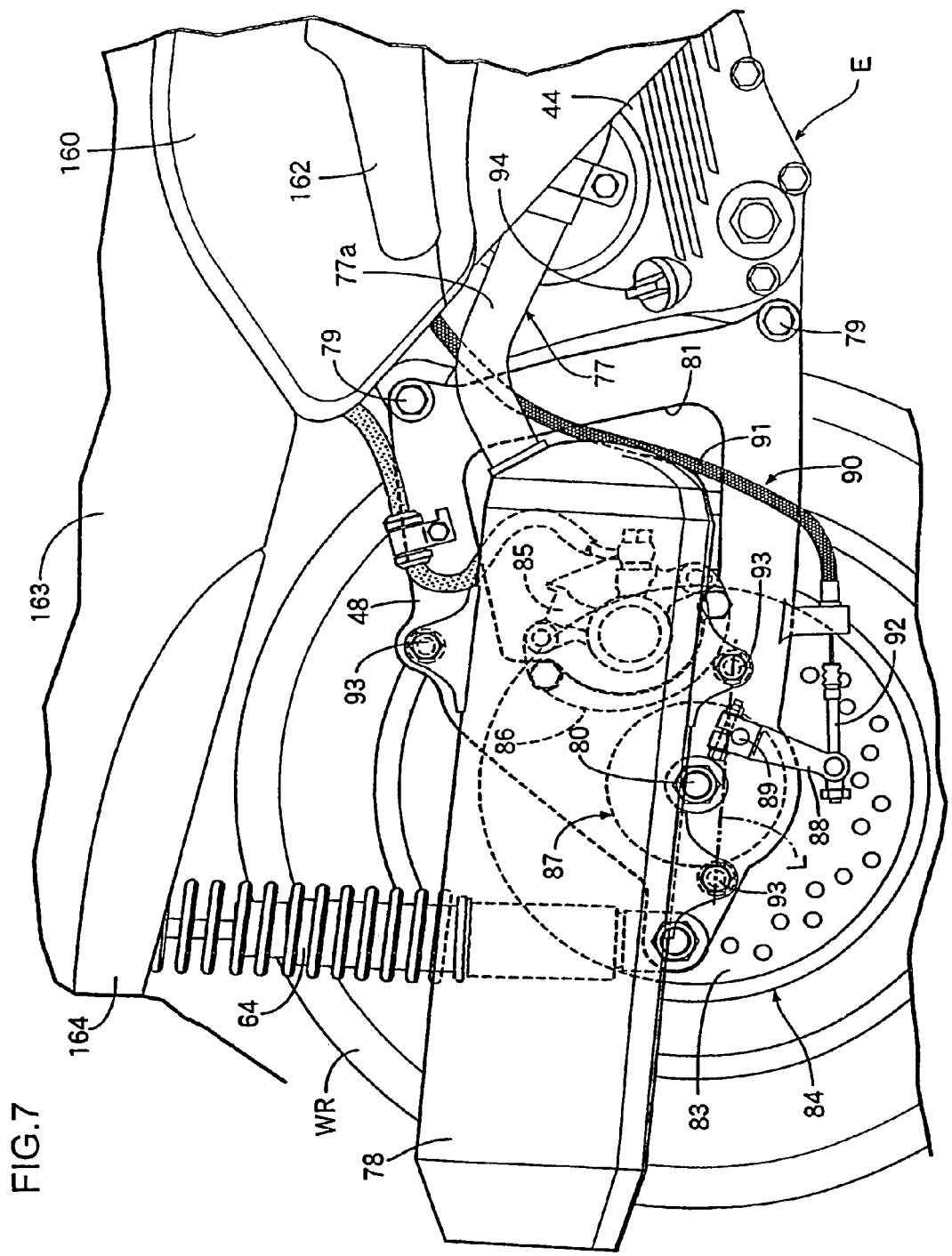
FIG. 7 is a right side view of the rear portion of the scooter type vehicle.

An exhaust pipe 77 is connected to a lower surface of the cylinder head. As shown in FIG. 7, the exhaust pipe 77 is connected to an exhaust muffler 78 which is disposed on the right side of the swing arm 48.

The swing arm 48 is formed in a generally triangular shape whose rear end side is narrow in side view. A front portion of the swing arm 48 is secured to the crank case 44 in the engine E at two upper and lower positions with bolts 79. An axle 80 of the rear wheel WR is supported by a rear portion of the swing arm 48, and the rear end of the rear cushion 64 is connected to the rear end of the swing arm 48 at a position to the rear of the axle 80.

An opening 81 is formed nearly centrally of the swing arm 48, and a brake caliper 85 of a rear brake 84 is disposed within the opening 81. The rear brake 84 is a disc brake provided with a brake disc 83 which is secured to a hub 82 of the rear wheel WR. A caliper bracket 86 is fixed to the swing arm 48, and the brake caliper 85 is fixed to the caliper bracket 86.

The opening 81 is formed in such a manner that its vertical width becomes narrower backward. The brake caliper 85 disposed in a rear portion of the opening 81 is fixed to the caliper bracket 86 which is fixed to the swing arm 48 at a position to the rear of the opening 81.

A drum brake 87 for parking brake is mounted to the hub 82 of the rear wheel WR, and a lever 88 for actuating the drum brake 87 to effect braking is disposed outside the swing arm 48. A pivot shaft 89 to which a base end of the lever 88 is fixed extends pivotably through the swing arm 48 and is inserted into the drum brake 87. On the other hand, an end portion of an outer cable 91 of a brake cable 90 is supported at a lower portion of the swing arm 48, and an end portion of an inner cable 92 projecting from the end portion of the outer cable 91 is connected to an extreme end of the lever 88.

Three support posts 48a, 48b, and 48c are integral with the swing arm 48 so as to project laterally outward, and an exhaust muffler 78 is secured to the support posts 48a to 48c with bolts 93. The exhaust muffler 78 is disposed laterally outside the swing arm 48 so as to cover the brake caliper 85 disposed in the opening 81. Besides, the brake caliper 85 is disposed between the support posts 48a and 48b out of the posts 48a to 48c and thus can be protected by the support posts 48a and 48b.

A lower portion of the exhaust muffler 78 is secured to the support posts 48b and 48c out of the support posts 48a to 48c on both front and rear sides of the axle 80 of the rear wheel WR. The support posts 48b and 48c position below the exhaust muffler 78. That is, the lower portion of the muffler 78 is clamped to the swing arm 48 at two positions on both front and rear sides of the axle 80. Between a line L joining those clamped portions and the exhaust muffler 78, the axle 80 and a clamped portion of a rear cushion 64 clamped to the swing arm 48 are disposed.

A level gauge 94 for detecting an oil level in the crank case 44 of the engine E is disposed in a lower portion of the crank case 44 at a position close to the connection where the exhaust pipe 77 is connected to the exhaust muffler 78. The exhaust pipe 77, in the vicinity of its connection to the exhaust muffler 78, is formed with an upwardly projected and curved portion 77a for avoiding interference with the level gauge 94.

Fuel is fed from the fuel tank 28 to the fuel injection valve 74 which injects the fuel toward the engine E. The fuel tank 28 is disposed in a space formed just after a front wheel WF. The space is surrounded by the pair of right and left upper down-frames 37 and the pair of right and left lower down-frames 38 of the vehicle body frame F. Besides, the fuel tank 28 is formed so as to extend vertically from behind the lower portion of the head pipe 27 to the lower portions of both lower down-frames 38.

Mounting plates 95 for fixing an upper portion of the fuel tank 28 are welded to the inclined portions 38a of both lower down-frames 38, and mounting plates 96 for fixing a lower portion of the fuel tank 28 are welded to the horizontal portions 38b of both lower down-frames 38.

A pump unit 97 is accommodated within the lower portion of the fuel tank 28. The pump unit 97 is mounted to the fuel tank 28 from the back side of the fuel tank 28 to be inserted into the fuel tank 28 from a mounting hole 98 formed in the back side of the lower portion of the fuel tank 28.

Besides, the pump unit 97 is mounted to the fuel tank 28 while a rotational axis thereof is inclined forwardly downward. A fuel filter 99 is attached to the pump unit 97 so as to suck in the fuel present within the fuel tank 28 and is disposed in the lowest portion within the fuel tank 28. A float 101 adapted to move up and down in accordance with the amount of fuel present within the fuel tank 28 is extended from the pump unit 97. A signal indicative of a residual amount of fuel detected by the float 101 is transmitted to the controller 75 accommodated within the control box 76 which is mounted to the throttle body 68.

The radiator 29, which has a fan 35, is positioned spacedly to the rear of the fuel tank 28. The radiator 29 is supported by a support frame 100. The support frame 100 is disposed between the rear portions of the horizontal portions 38b of both lower down-frames 38 in the body frame F and the rear portions of both upper down-frames 37 in the body frame F.

A reservoir tank 104 which is contiguous to the radiator 29 is disposed under the right step floor 159 out of the pair of right and left step floors 159 of the vehicle body cover 34. A hose 105 is connected to the reservoir tank 104 and extends upward, and an upper end of the hose 105 is connected to a water supply port-forming member 108. The water supply port-forming member 108 forms a water supply port 107 capable of being opened and closed with a cap 106.

The water supply port-forming member 108 is supported by the mounting portion 54 which is for mounting the tension rod 53 to the vehicle body frame F. The tension rod 53 is disposed between the vehicle body frame F and the unit swing engine UE which is swingably supported by the vehicle body frame F. That is, the water supply port-forming member 108 is supported by the support tube 55 which extends backwardly downward from the front portion of the right seat rail 39 and which constitutes a part of the mounting portion 54.

Referring now to FIGS. 8 and 9, the storage box 30 is disposed among the rear portions of both upper down-frames 37 in the vehicle body frame F, both seat rails 39, and both rear frames 40. The storage box 30 is made up of a box body 110 and an upper cover 111. The box body 110 has an open upper end. The upper cover 111 is connected to the box body 110 so as to cover a rear portion of the box body 110 from above. The storage box 30 is disposed under the riding seat 31 so as to extend from below a front end of the riding seat 31 up to near upper portions of the rear cushions 64.

For supporting the storage box 30 on the vehicle body frame F, front support members 112 are welded respectively to intermediate portions of the pair of seat rails 39 in the vehicle body frame F, and longitudinally long rear support members 113 are welded respectively to the rear portions of both seat rails 39. Front mounting portions 110a and rear mounting portions 110b are provided at both-side upper positions of the box body 110 of the storage box 30. The front mounting portions rest on the front support members 112, and the rear mounting portions 110b rest on longitudinally intermediate portions of the rear support members 113. The front mounting portions 110a are secured to the front support members 112 with bolts 114, while the rear mounting portions 110b are secured to the rear support members 113 with bolts 115.

A front helmet storage portion 119, a rear helmet storage portion 120, and a substantially flat shallow portion 110c are formed on a bottom wall of the storage box 30, i.e., a bottom wall of the box body 110. The front helmet storage portion 119 is disposed under the front seat 32 so as to permit a helmet H1 to be received therein. The rear helmet storage portion 120 is disposed under the rear seat 33 so as to permit a helmet H2 to be received therein. The shallow portion 110c is disposed between the front and rear helmet storage portions 119 and 120. The front and rear helmet storage portions 119 and 120 are formed in a downwardly expanded shape. Besides, a front edge of the upper cover 111 in the storage box 30 is formed in a backwardly expanded arcuate shape in top view so as to permit the helmet H2 to be accommodated into the rear helmet storage portion 120. A lighting unit 116 for lighting the interior of the storage box 30 is attached to an inner side face of the box body 110 at a portion corresponding to a front portion of the upper cover 111.

The throttle body 68 and the fuel injection valve 74 are disposed under the shallow portion 110c of the storage box 30 in such a manner that respective upper end are substantially flush with each other, and also disposed is the water supply port 107 of the reservoir tank 104. Further, a first maintenance lid 117 is openably attached to the shallow portion 110c at a position above the water supply port 107.

A rear expanded portion 121 is provided in a rear portion of the storage box 30. The rear expanded portion 121 extends backward beyond the support pipe 62 as a mounting portion for mounting upper portions of the rear cushions 64 to a rear portion of the vehicle body from F and beyond a rear end of the rear seat 33. The rear expanded portion 121 is expanded backward up to approximately the same position as a rear end of a grab rail 118 which is disposed around the rear seat 33. Besides, a narrow portion 121a which gets into between right and left tail light units 123 in top view is formed centrally of a rear portion of the rear expanded portion 121.

A lower portion of the rear expanded portion 121 is disposed below the support pipe 62 which is a mounting portion for mounting the upper portions of the rear cushions 64 to the rear portion of the vehicle body frame F. Consequently, a raised portion 110d corresponding to the mounting portions for mounting the upper portions of the rear cushions 64 to the vehicle body frame F is formed by partially raising the bottom wall of the storage box 30, i.e., the box body 110. A container portion 124 is formed within the rear expanded portion 121. The raised portion 110d interposed between the container portion 124 and the rear helmet storage portion 120.

The rear seat 33 of the riding seat 31 is formed so as to cover the front portion side of the upper cover 111 in the storage box 30. A front edge of the rear seat 33 is formed in a backwardly expanded arcuate shape in top view to match the front edge of the upper cover 111.

Referring now to FIG. 10, the rear seat 33 is removably attached to the upper cover 111 of the storage box 30. Receiving plate portions 111a projecting sideways are provided on both sides of the front portion of the upper cover 111, and elastic rings 125 made of an elastic material are fitted on the receiving plate portions 111a respectively. On the other hand, fitting lugs 126 are integrally projected from a bottom plate 33a of the rear seat 33. Annular recessed portions 126a for elastic engagement therein with the elastic rings 125 are formed in outer peripheries of the fitting lugs 126. By bringing the elastic rings 125 fitted on the receiving plate portions 111a into elastic engagement with annular recessed portions 126a, the rear seat 33 is mounted removably to the upper cover 111.

A first rib 127 which is in an endlessly continuous quadrangular shape is formed on an upper surface of the upper cover 111, and a storage space 128 capable of being utilized upon removal of the rear seat 33 is formed on the upper surface of the upper cover 111 so as to be surrounded by the first rib 127. Further, an endlessly continuous, second rib 129 is suspended from the bottom plate 33a of the rear seat 33 so as to surround the first rib 127. A labyrinth structure which surrounds the storage space 128 is constituted by the first and second ribs 127 and 129.

The grab rail 118 is a metallic rail integrally formed with a pair of grip portions 118a and a connecting portion 118b which connects between rear ends of the grip portions 118a. The grip portions 118a are disposed on both sides of the rear seat 33 and extend longitudinally. Front portions of both grip portions 118a are fixed to the rear support members 113 with bolts 134 at two positions which sandwich the fixed portions of the storage box 30 to the rear support members 113 from both front and rear. The rear support members 113 are welded to the rear portions of the seat rails 39 in the vehicle body frame F.

The connecting portion 118b is disposed at a position spaced upward from an upper portion of the rear expanded portion 121 of the storage box 30 and is integrally contiguous to the rear ends of both grip portions 118a so as to be substantially flush with an upper surface of the rear seat 33. A back rest 135 for holding the waist of a passenger on the rear seat 33 from behind is removably attached to the connecting portion 118b removably.

More specifically, plural leg portions 136a adapted for abutment onto the connecting portion 118b of the grab rail 118 are integrally provided projectingly on a bottom plate 136 of the back rest 135. Nuts 138 are embedded in the leg portions 136a. Bolts 137 are inserted into the connecting portion 118b of the gram rail 118 from below. The bolts 137 are threadedly engaged with the nuts 138 and tightened. Thus, the back rest 135 is removably secured to an upper surface of a rear portion of the grab rail 118, i.e., an upper surface of the connecting portion 118b.

The back rest 135, when seen in side view, is formed in a generally streamlined shape having as upper surfaces a forwardly declined front slant surface 135a and a backwardly declined rear slant surface 135b. The back rest 135, when seen in top view, is formed so as to become narrower backward. The grab rail 118 and the back rest 135 overlap each other substantially in the whole.

The front seat 32 of the riding seat 31 is integrally provided with a back rest portion 32a at a rear portion thereof. The back rest portion 32a is raised backward so as to hold the waist of a rider on the front seat 32 from behind. The front seat 32 is disposed over the storage box 30 so as to cover from above a front opening of the storage box 30 which is not covered with the upper cover 111. A front end portion of the front seat 32 is connected to a front end of the storage box 30 through a hinge pin 139. That is, the front end portion of the front seat 32 is supported by the storage box 30 so that the front seat 32 can be opened and closed vertically.

A generally U-shaped striker 141 is attached to a rear portion of a bottom plate 140 of the front seat 32. A seat catcher 142 is disposed at a position corresponding to a transversely central position of the rear seat 33 and between the front portion of the upper cover 111 in the storage box 30 and front portions of the front and rear seats 32 and 33. The seat catcher 142 can switch over between a seat catch condition in which the striker 141 is gripped to keep the front seat 32 closed and a seat catch release condition in which the gripped state of the striker 141 is released to permit opening of the front seat 32. When the front seat 32 which is in an upwardly open condition is brought down to close the front opening of the storage box 30, the seat catcher 142 comes into engagement with the striker 141 and assumes the seat catch condition. When a power transfer cable 143 is pulled, the seat catcher 142 switches from the seat catch condition to the seat catch release condition.

The seat catcher 142 is provided on a metallic bridge plate 144 disposed between front ends of both grip portions 118a of the grab cable 118. The bridge plate 144 is formed so as to get in between the upper cover 111 and the rear seat 33 from the front ends of both grip portions 118a and extend along an upper surface of the front portion of the upper cover 111.

A cover 146 having a cutout portion 145 (see FIG. 12) for removable insertion therein of the striker 141 is attached to a transversely central front portion of the rear seat 33 so as to cover the seat catcher 142 from above in an open condition of the seat 32.

Figure 11:
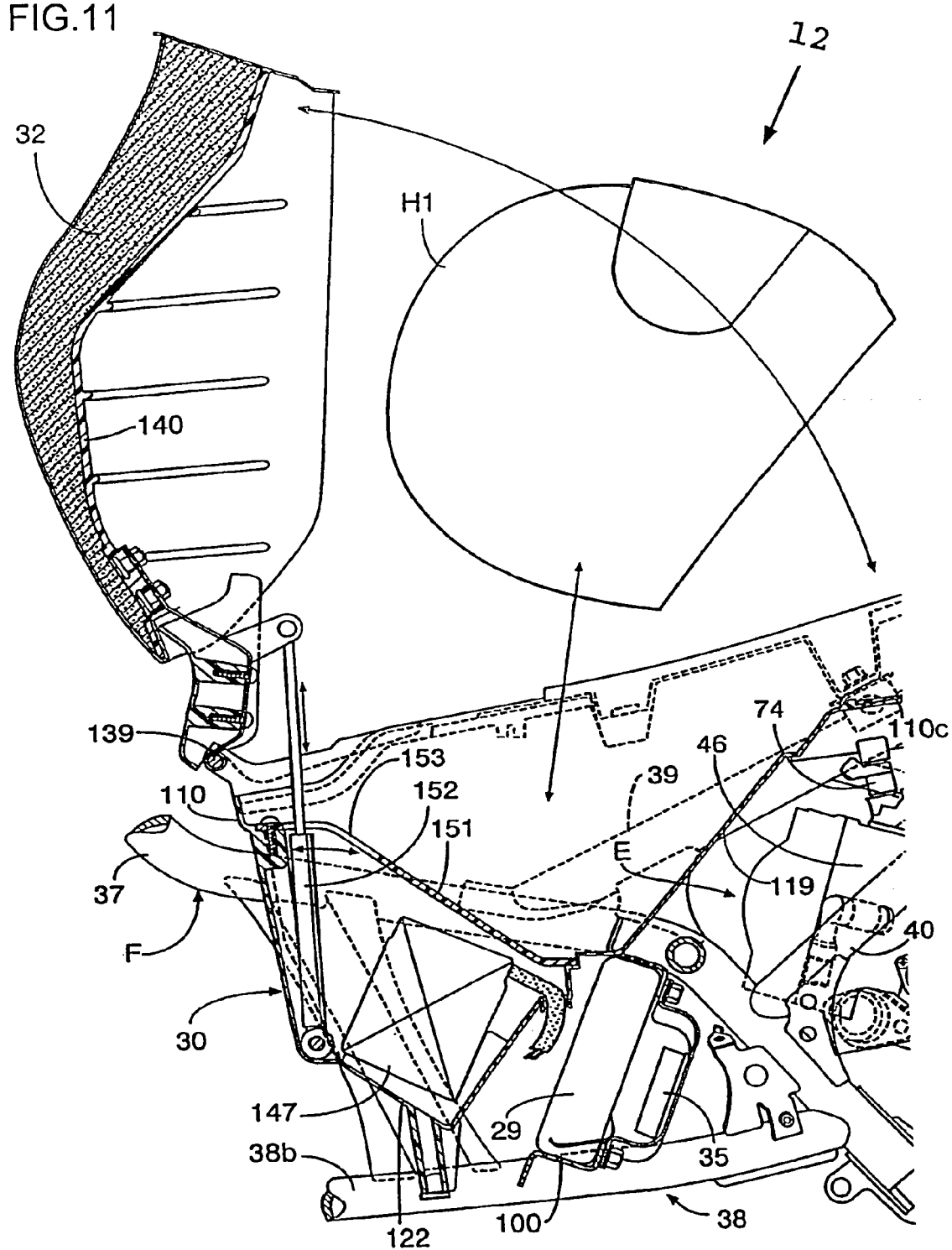
FIG. 11 is an enlarged view of a principal portion of FIG. 5 with a front seal open.
Figure 12:
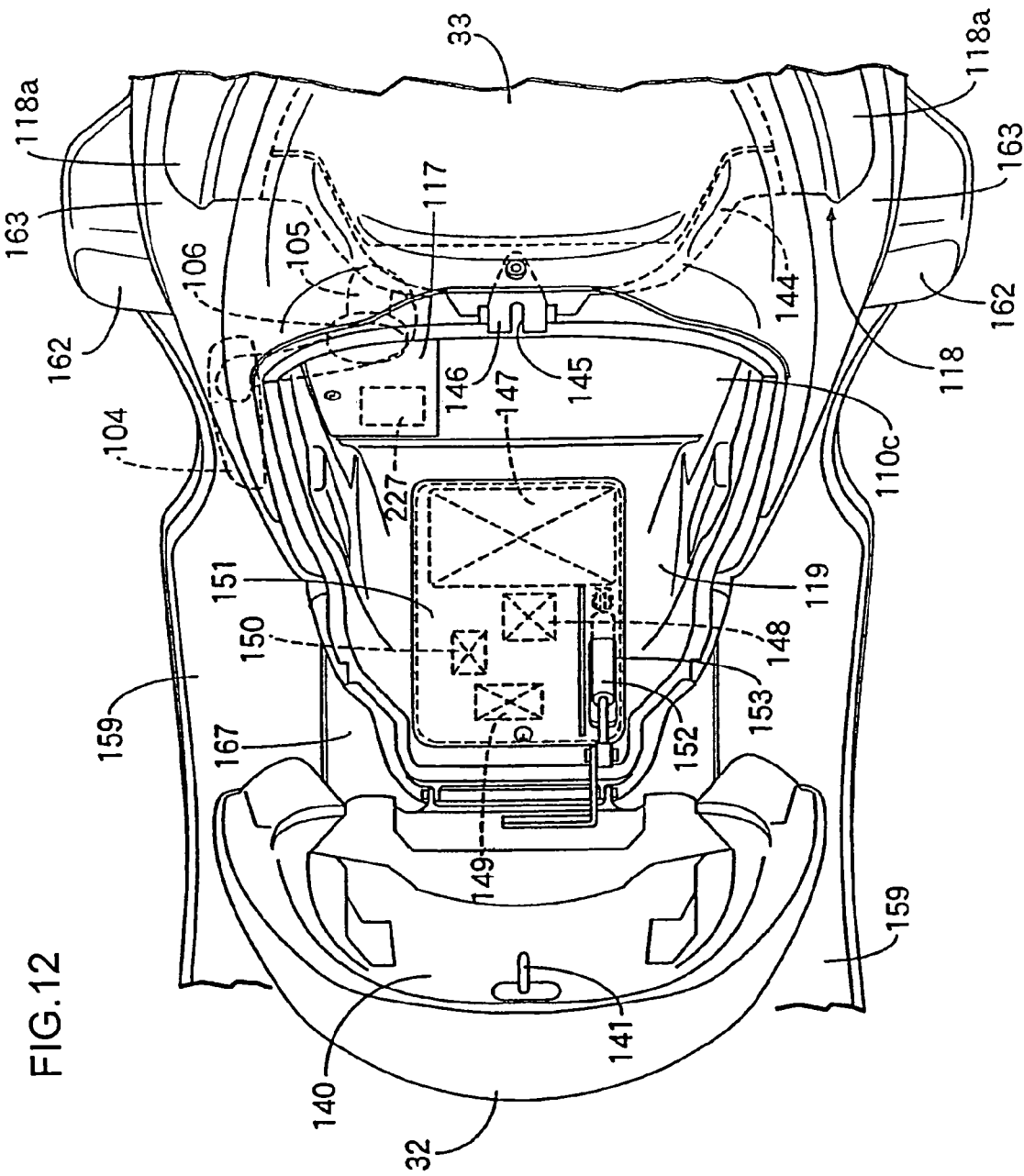
FIG. 12 is a view as seen in the direction of arrow 12 in FIG. 11.
Figure 13:
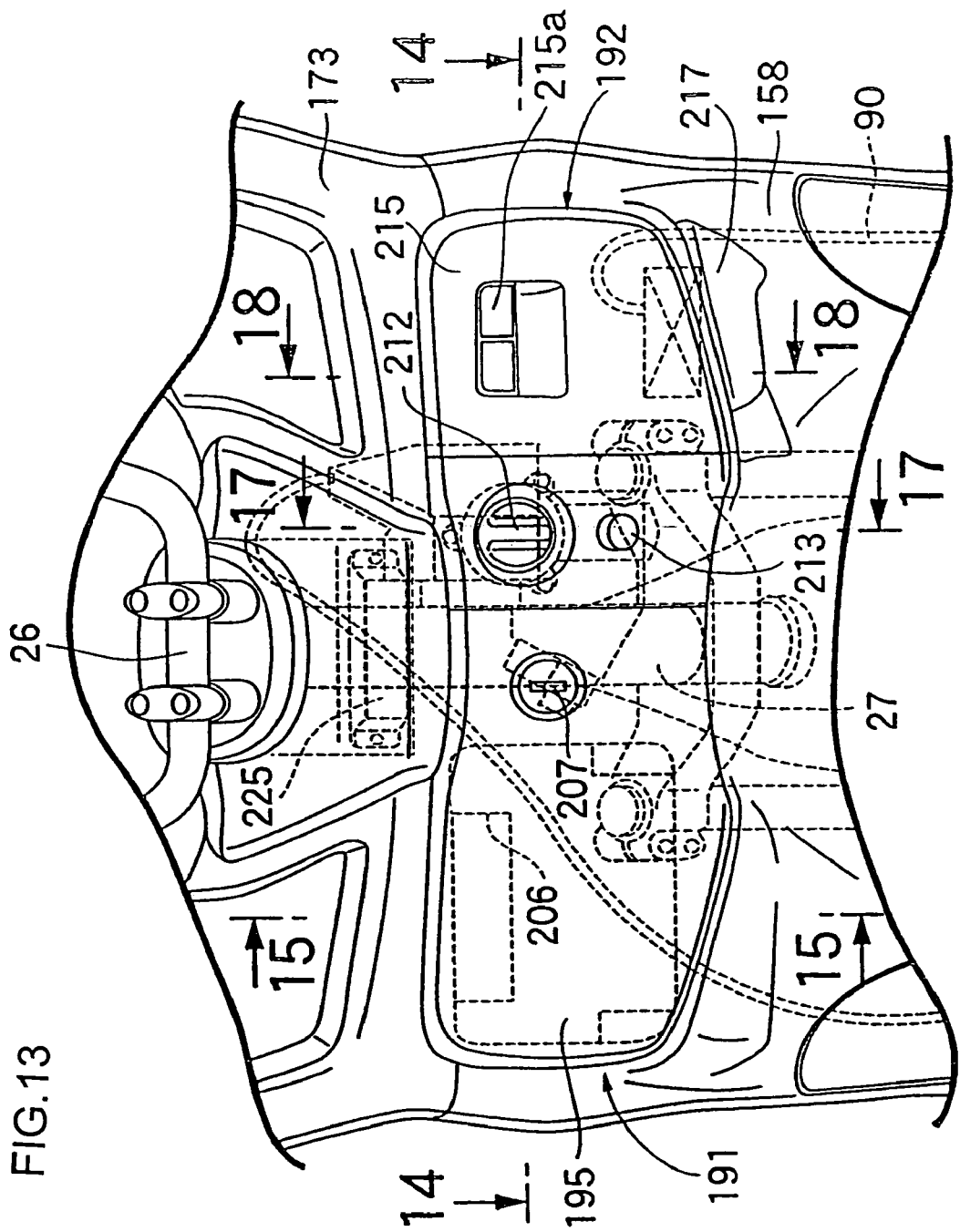
FIG. 13 is an enlarged view as seen in the direction of arrow 13 in FIG. 1.
Figure 14:
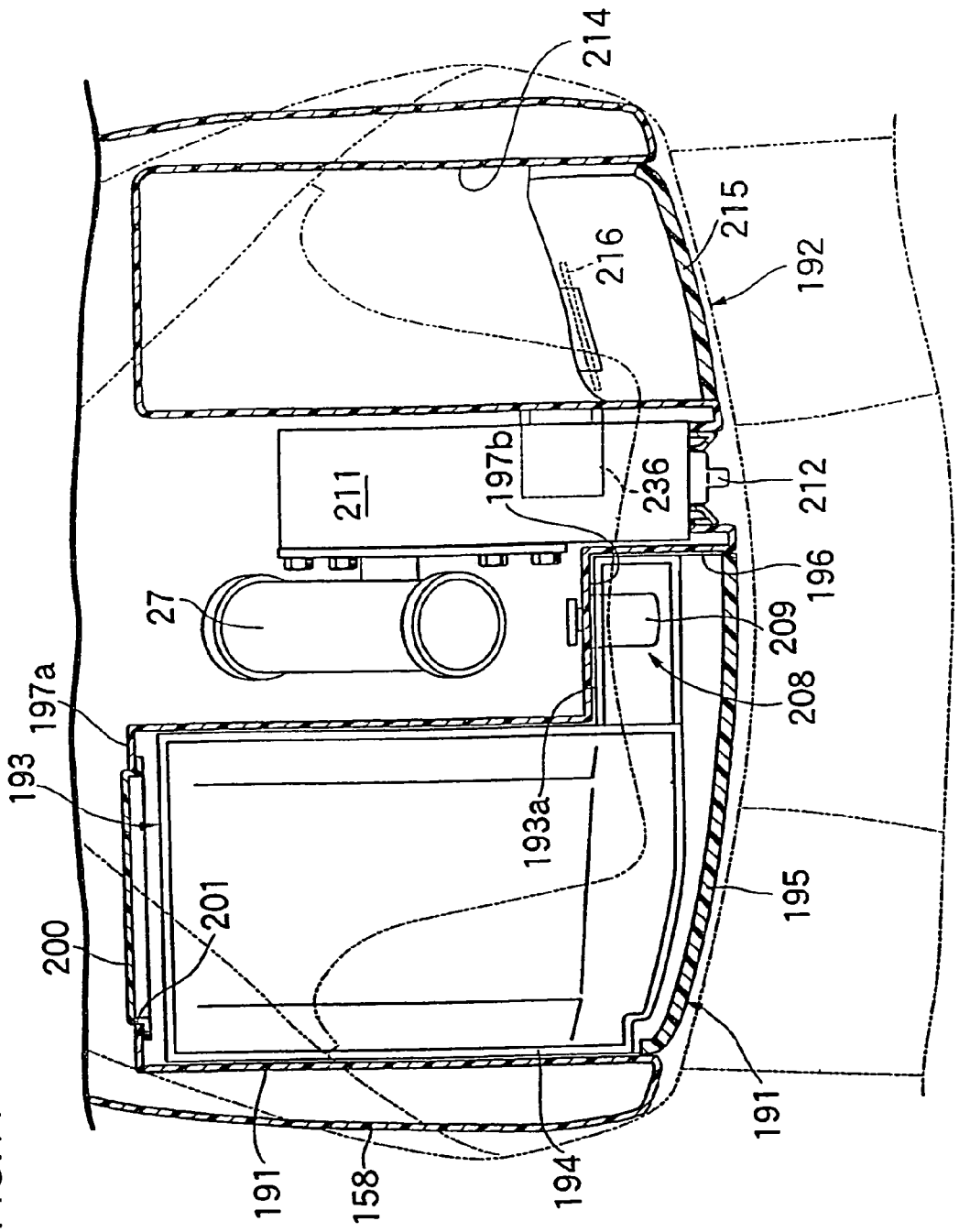
FIG. 14 is a schematic sectional view taken along line 14-14 in FIG. 13.
Figure 15:
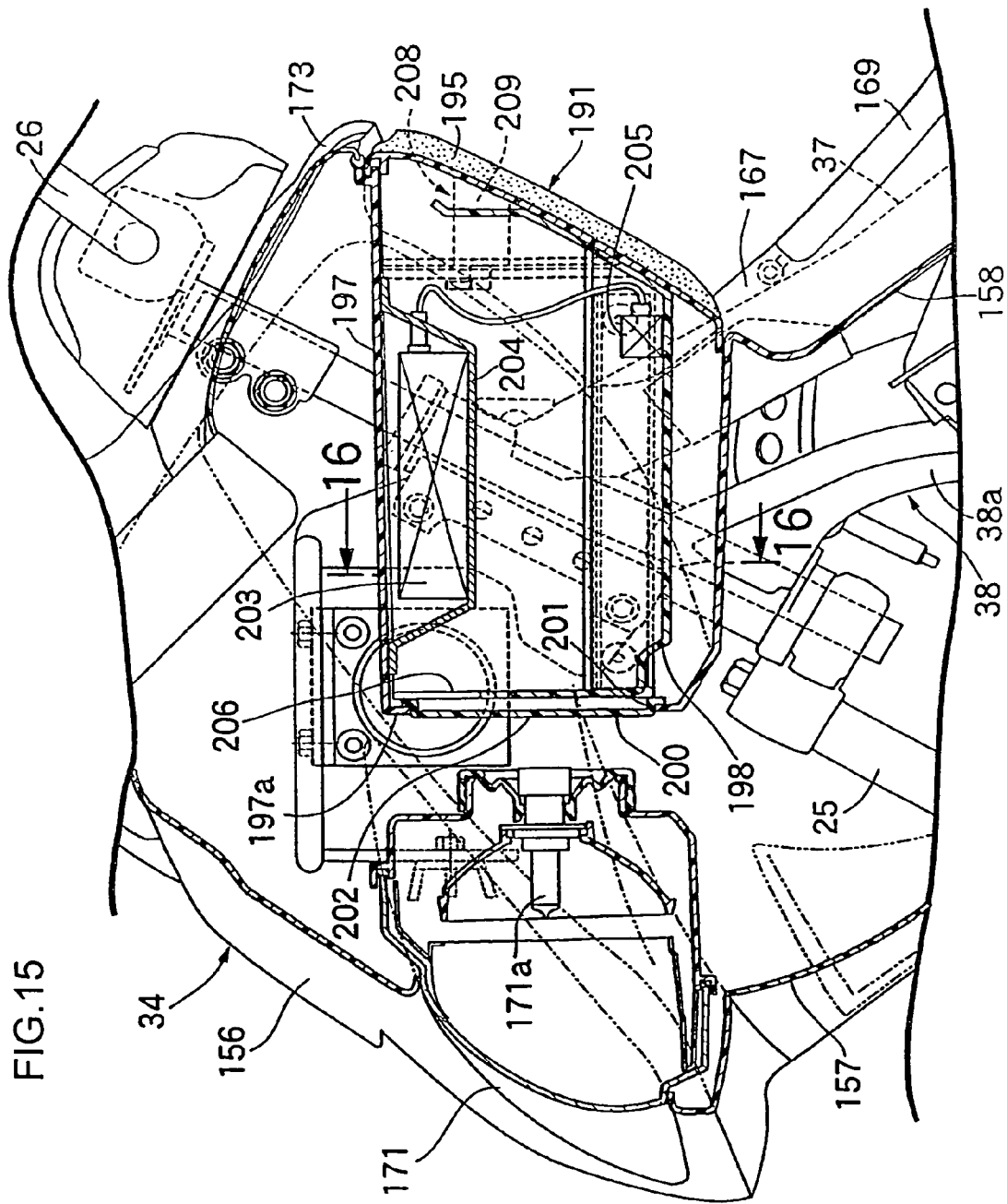
FIG. 15 is a sectional view taken along line 15-15 in FIG. 13.
Figure 16:
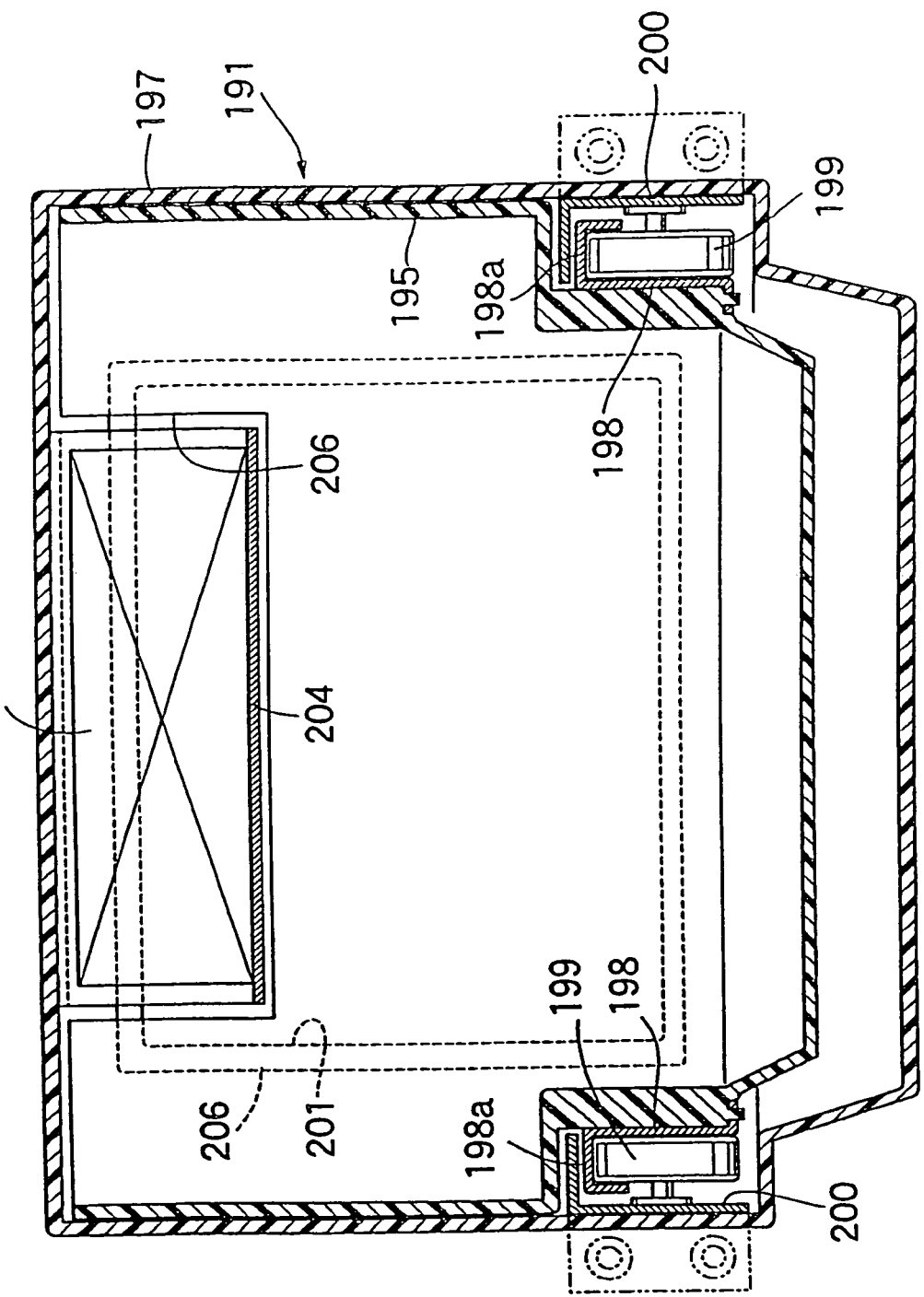
FIG. 16 is a sectional view taken along line 16-16 in FIG. 15.

Referring now to FIGS. 11 and 12, the fuel tank 28 is disposed in front of the storage box 30, and a front expanded portion 122 which is expanded near a bottom of the fuel tank 28 is disposed at a lower portion of the front end of the storage box 30 and between the fuel tank 28 and the radiator 29. A battery 147 as an electric appliance is accommodated within the front expanded portion 122. That is, the battery 147 is disposed between the fuel tank 28 and the radiator 29.

In addition to the battery 147, electric appliances 148, 149, and 150 are also accommodated within the front expanded portion 122.

A second maintenance lid 151, which partitions between the front expanded portion 122 and the front helmet storage portion 119, is openably fitted on the bottom wall of the box body 110 of the storage box 30. By opening the second maintenance lid 151 in an open condition of the front seat 32, it is possible to effect maintenance of the battery 147 and the electric appliances 148 to 150 accommodated within the front expanded portion 122.

A damper rod 152 is disposed between the front portions of the front seat 32 and the storage box 30. The damper rod 152 permits the front seat 32 to be opened with a light force and allows the front seat 32 to be closed at a low closing speed and thus functions to assist opening and closing motions of the front seat 32. A lower portion of the damper rod 152 is accommodated within the front expanded portion 122, and a slit 153 is formed in the second maintenance lid 151. The slit 153 is for insertion therein of the damper rod 152 while permitting displacement of the damper rod 152 which occurs with opening or closing motion of the front seat 32.

Referring again to FIG. 1, the vehicle body cover 34 includes a front cover 156, a pair of right and left front side covers 157, a leg shield 158, a pair of right and left floor center covers 160, a pair of right and left floor side covers 161, a pair of right and left passenger steps 162, a pair of right and left body side covers 163, a rear lower cover 164, a rear upper cover 165, and a rear center cover 166. The front cover 156 covers a front portion of the head pipe 27 and an upper portion of the front wheel WF. The front side covers 157 are welded to both right and left sides of the front cover 156. The leg shield 158 is welded to both front side covers 157 so as to cover the front side of legs of the rider sitting on the front seat 32 and also cover the head pipe 27 from behind. The floor center covers 160 extend backward contiguously to the leg shield 158 and form step floors 159 at their lower end portions. The floor side covers 161 are suspended downward from outer edges of the step floors 159. The passenger steps 162 are provided respectively at rear portions of the step floors 159. The body side covers 163 are disposed on both lower sides of the passenger seat 31 and extend backward contiguously to the floor side covers 16. The rear lower cover 164 is contiguous to rear lower portions of the body side covers 163. The rear upper cover 165 is disposed between the rear expanded portion 121 of the storage box 30 and the rear portion of the grab rail 118. The rear center cover 166 is disposed between the pair of right and left tail light units 123 and is contiguous to the rear upper cover 165 so as to cover the narrow portion 121a in the rear expanded portion 121 of the storage box 30 from behind.

With a part of the leg shield 58 and the pair of right and left floor center covers 160, a floor tunnel portion 167 raised upward between both step floors 159 is disposed from behind the head pipe 27 toward a lower portion of the front end of the riding seat 31. The floor tunnel portion 167 is formed so as to be positioned above the fuel tank 28 and the radiator 29. For making it possible to open an oil supply cap 168 provided at an upper end of the fuel tank 28 and supply oil into the fuel tank 28, an oil supply lid 169 is openably attached to the floor tunnel portion 167. Further, a hinge cover 170, which covers a hinge portion of the storage box 30 of the front seat 32, is welded to a rear end of the floor tunnel portion 167.

Head lights 171 are disposed on both sides of a front portion of the front cover 156 and between front portions of the pair of right and left front side covers 157, and winkers (blinkers) 172 are disposed in the front portions of both front side covers 157 at positions below the head lights 171. A panel 173 for disposing meters thereon is welded to upper portions of the front cover 156, both front side covers 157, and the leg shield 158. A meter visor 173a is integral with a front portion of the panel 173 so as to be raised upward. In front of the meter visor 173a is disposed a windshield 174.

A front fender 175, which covers the front wheel WF from above, is supported by the front fork 25. A pair of back mirrors 176, a switch case 177 for operating an audio system, and a switch case 178 for operating lights, are attached to the steering handle 26.

A lid 180 for plug maintenance, which is for the maintenance of a spark plug 179 in the engine E, is openably attached to the left floor center cover 160 out of the pair of right and left floor center covers 160 at a position ahead of the passenger steps 162.

A license plate 182, a reflector 183, and a license light 184 are attached to a rear fender 181 which covers the rear wheel WR from behind. The rear fender 181 is attached to the rear expanded portion 121 of the storage box 30 together with the pair of right and left tail light units 123 and the rear upper cover 165 and the rear center cover 166 as cover members constituting a part of the vehicle body cover 34.

As shown in FIG. 5, a pair of ridge portions 110e functioning as a rear fender are formed on a lower surface of the box body 110 of the storage box 30 in front of the rear fender 181. The pair of ridged portions 110e are provided projectingly so as to be positioned on both right and left sides of the rear wheel WR.

In the leg shield 158, as shown in FIGS. 13 to 16, first and second goods storage portions 191 and 192 are formed dividedly right and left. The first goods storage portion 191 is constituted as a drawer type having a storage case 193 capable of being drawn out and removed from the leg shield 158.

The storage case 193 includes a case body 194 which, for example, is formed of a synthetic resin in the form of a rectangular box having an upper opening and a decorative cover 195 fixed to an outer end of the case body 194. A rectangular opening 196 for insertion and removal therethrough of the storage case 193 is formed in the leg shield 158, and a storage wall 197 is formed in a rectangular tube shape integrally contiguously to the opening 196. An inner end of the storage wall 197 is closed with an end wall 197a.

A pair of longitudinally extending movable rails 198 are fixed to both-side lower portions of the case body 194, and a pair of support portions 198a are integrally formed at upper ends of the movable rails 198. The support portions 198a are formed in a generally U shape having a lower opening. On the other hand, a pair of fixed rails 200 longitudinally extending correspondingly to the movable rails 198 are fixed to both inner side faces of the storage wall 197. Rollers 199 for placing thereon the support portions 198a of the movable rails 198 are supported through shafts at plural longitudinal spaced positions, for example at two positions, of the fixed rails 200. As a result, the storage case 193 is inserted inside the storage wall from the opening 196. The storage case 193 can slide between a storage position in which the decorative cover 195 of the storage case 193 is nearly flushly contiguous to the back side of the leg shield 158 and a draw-out position in which the greater part of the decorative cover 195 is drawn out from the storage wall 197. It is also possible to draw out the whole of the storage case 193 from the leg shield 158. Besides, the storage case 193 is formed so that in the storage position it covers the head pipe 27 from the left side thereof.

A maintenance window 201 is formed in the end wall 197a of the storage wall 197. A maintenance work can be done therethrough such as replacing bulbs 171a of the headlight 171 positioned ahead of the end wall 197a when the storage case 193 is drawn out from the leg shield 158. The window 201 is covered with a removable lid 202.

A support frame 204 for placing an audio amplifier 203 thereon is secured to an upper surface of the storage wall 197, and a connector 205 to the amplifier 203 can be connected to a portable sound source such as MP3, CD, or MD player accommodated within the storage case 193. Moreover, for avoiding interference of the support frame 204 with the storage case 193 at the time of sliding the storage case 193 between the storage position and the draw-out position, a cutout portion 206 corresponding to the support frame 204 is formed in an inner end of the case body 194 of the storage case 193.

The amplifier 203 may be fixed within the storage case 193. In this case, the support frame 204 becomes unnecessary and therefore it is not necessary to form the cutout portion 206 in the inner end of the case body 194.

An overhanging portion 193a which overhangs transversely inwards of the vehicle body is provided on an outer end side of the storage case 193. Also on the storage wall 197 side is formed a recessed portion 197b for accommodating the overhanging portion 193a therein at the time of storage of the storage case 193 in the storage position. The recessed portion 197b is formed so as to confront the head pipe 27 from behind the head pipe 27.

A lock mechanism 208 is provided between the storage case 193 and the leg shield 158. The lock mechanism 208 permits switching between connection and disconnection of the leg shield 158 to and from the storage case 193 in accordance with a key operation which is performed through a keyhole 207 confronting a front face of the storage case 193. The lock mechanism 208 is provided in the overhanging portion 193a of the storage case 193 in such a manner that a cylinder lock 209, which is operated in accordance with a key operation performed through the key hole 207, switches between engagement with and disengagement from the recessed portion 197b of the storage wall 197. The lock mechanism 208 is disposed at a position which confronts the head pipe 27 from behind.

A handle lock module 211 which can disenable the steering operation of the steering handle 26 is disposed near the head pipe 27 on the side opposite to the first goods storage portion 191, and the handle lock module 211 is disposed to be sandwiched between the first goods storage portion 191 and the second goods storage portion 192.

Figure 17:
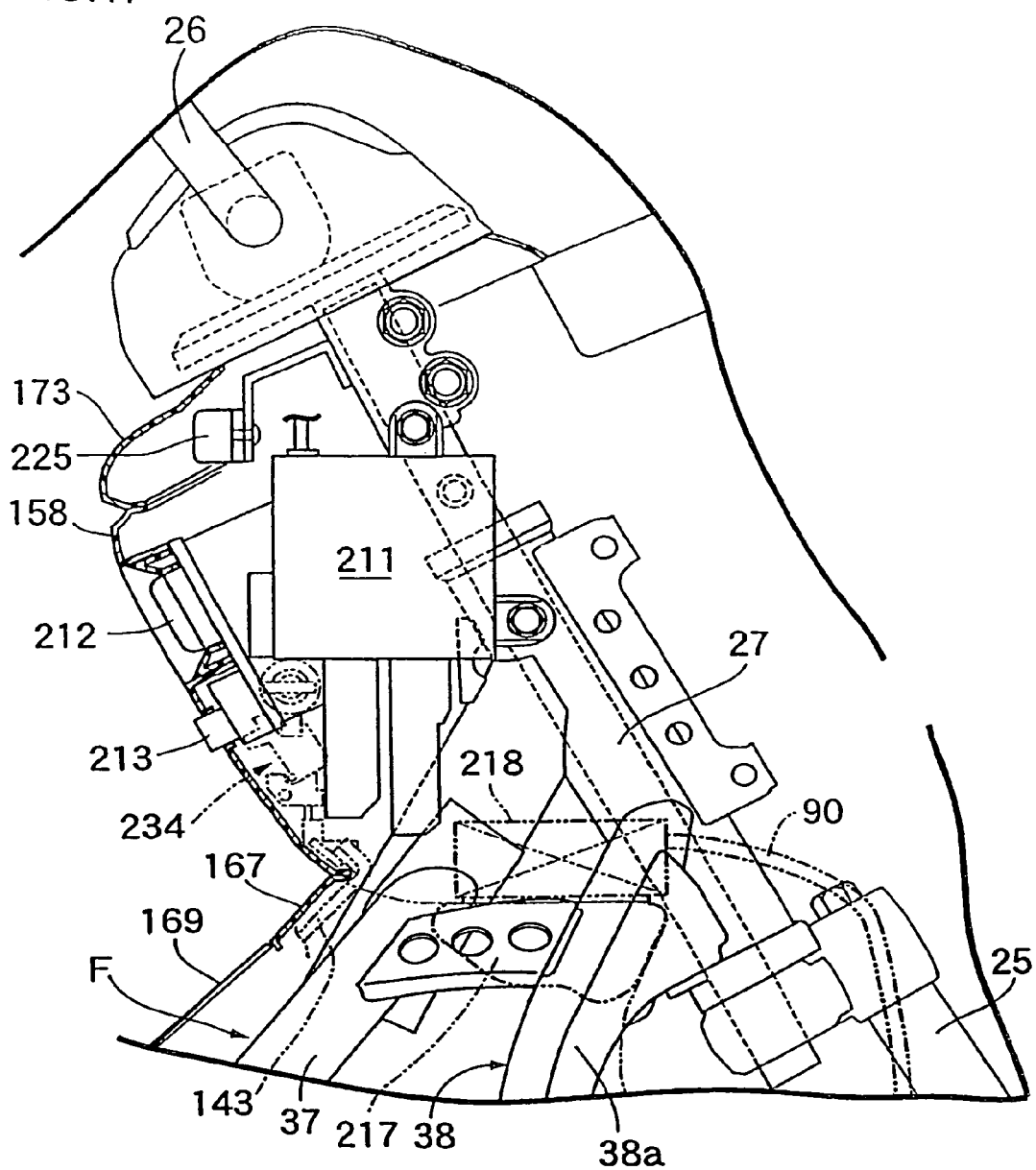
FIG. 17 is a sectional view taken along line 17-17 in FIG. 13.

In FIG. 17, the handle lock module 211 enables the steering operation of the steering handle 26 and start-up of the engine E in accordance with operation under predetermined conditions of a knob 212 which confronts the back side of the leg shield 158 between the first and second goods storage portions 191 and 192. Below the handle lock module 211 and on the back side of the leg shield 158 is disposed a seat unlocking switch 213 for enabling an opening operation of the front seat 32 in the riding seat 31 by operation under predetermined conditions.

Figure 18:
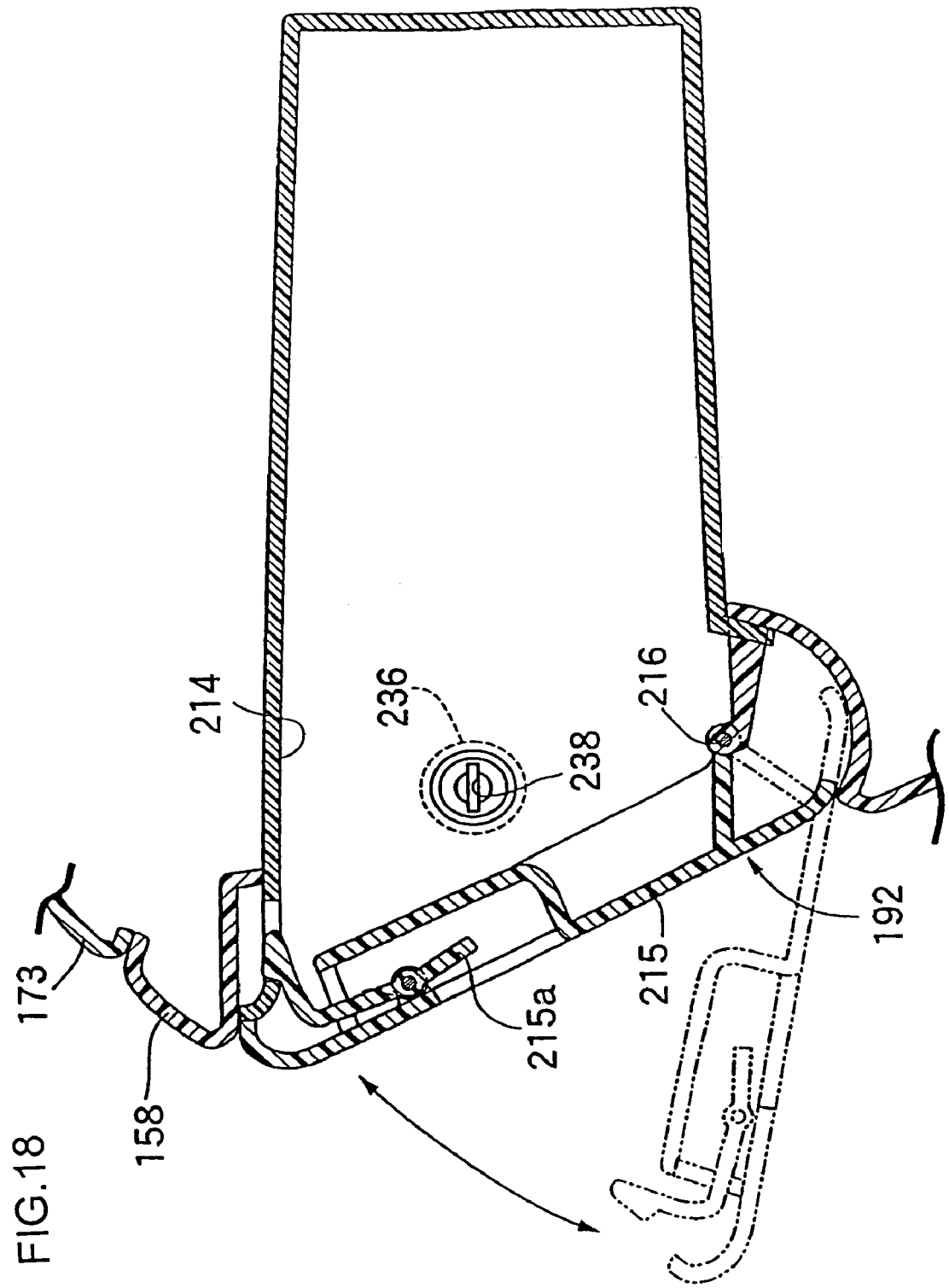
FIG. 18 is a sectional view taken along line 18-18 in FIG. 13.

In FIG. 18, the second goods storage portion 192 includes a recessed storage portion 214 formed in the leg shield 158. The recessed storage portion 214 is openably covered with a lid member 215, which is hinged to the leg shield 158. The recessed storage portion 214 is formed smaller than the storage case 193 of the first goods storage portion 191 and so as to be slightly narrower toward a front end thereof.

As indicated with a chain line in FIG. 18, the lid member 215 is hinged to the leg shield 158 through a pivot shaft 216. The lid member 215 is pivotable between an open position in which it pivots downward to open the recessed storage portion 214 and a closed position in which it closes the recessed storage portion 214 as indicated with a solid line in FIG. 18. A knob portion 215a is pivotably mounted on the lid member 215 to enable a pivoting operation.

A parking brake lever 217 for operating the brake cable 90 connected to the drum brake 87 on the rear wheel WR is supported by the leg shield 158 pivotably through a pivot shaft at a position under the lid member 215, and the brake cable 90 is extended from a parking brake mechanism 218 which operates in accordance with operation of the parking brake lever 217.

Figure 19:
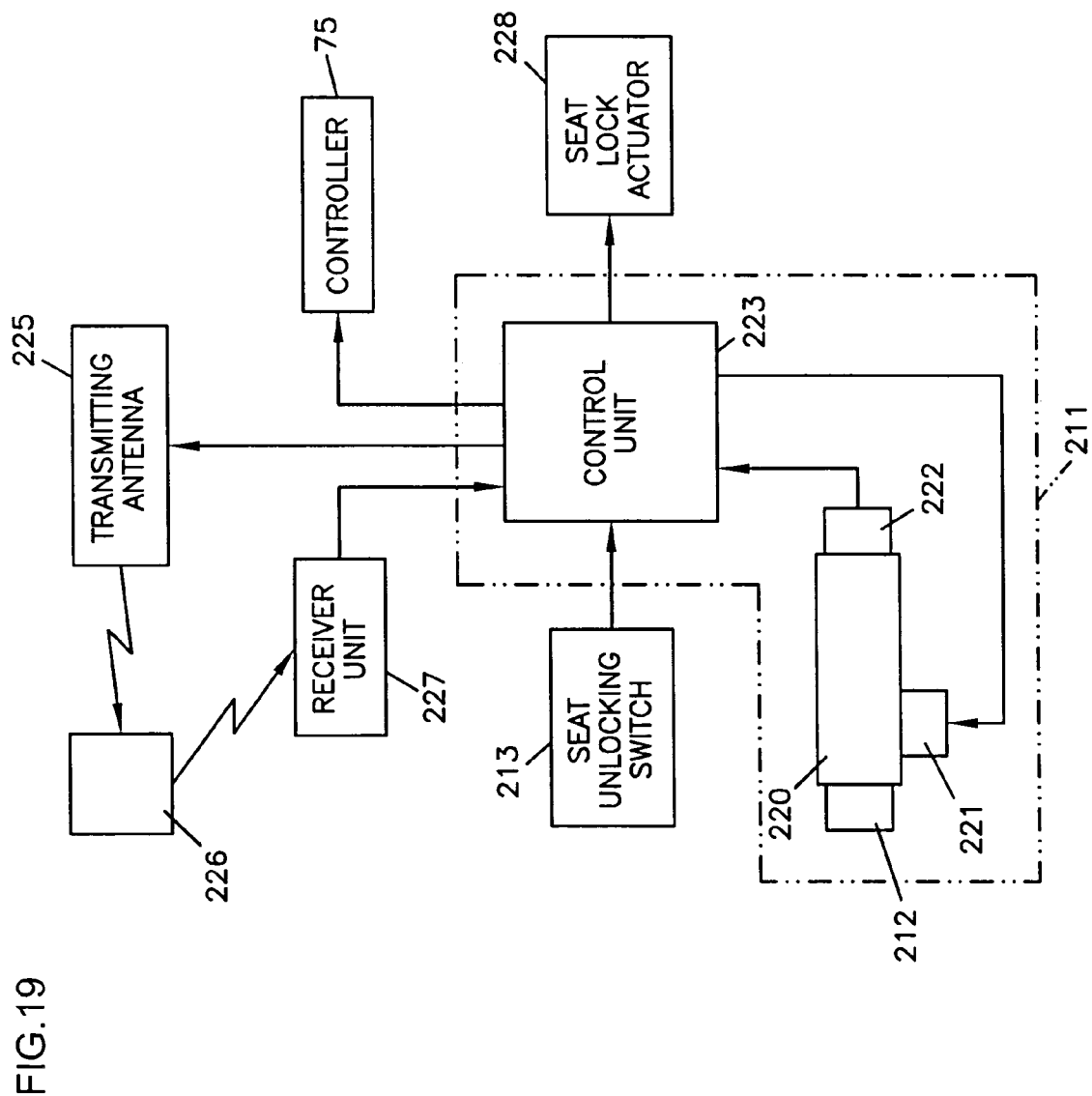
FIG. 19 illustrates the construction of a smart entry system.

In FIG. 19, the controller 75 accommodated in the control box 76 attached to the throttle body 68, the handle lock module 211, and the seat unlocking switch 213 constitute a part of a smart entry system. The handle lock module 211 includes a cylinder lock 220, a lock solenoid 221, a main switch 222, and a control unit 223. The cylinder lock 220 can be turned by the knob 212 to unlock the steering handle 26 from the head pipe 27 at the time of turning operation. The lock solenoid 221 can disable the cylinder lock 220 from turning. The main switch 222 performs a switching motion in accordance with a turning motion of the cylinder lock 220. The control unit 223 is inputted a signal from the main switch 222. The lock solenoid 221 is controlled by the control unit 223.

The control unit 223 controls a transmitting antenna 225 so as to transmit a signal which urges transmission of an ID signal from a normal portable transmitter 226 carried by a vehicle user. Moreover, a signal reception result in a receiver unit 227 which receives a signal from the portable transmitter 226 is inputted to the controller unit 223. When the control unit 223 makes it sure that the ID signal transmitted from the portable transmitter 226 is a predetermined signal, it causes the lock solenoid 221 to operate so as to permit the turning operation of the cylinder lock 220 by the knob 212.

Further, when the control unit 223 makes it sure that the ID signal transmitted from the portable transmitter 226 is a predetermined signal, it not only causes a seat lock actuator 228 to operate in accordance with operation of the seat locking switch 213 but also enables controlling operation of the engine E by the controller 75 upon conduction of the main switch 222.

The receiver unit 227 is disposed within the storage box 30 or within the riding seat 31. In this embodiment, a part of the shallow portion 110c of the storage box 30 is depressed downward to form a receiver unit storage portion 110f, and the receiver unit 227 is accommodated within the receiver unit storage portion 110f. Besides, the first maintenance lid 117 for performing maintenance associated with the engine E disposed under the storage box 30 is openably provided in the shallow portion 110c. The receiver unit 227 is accommodated within the receiver unit storage portion 101f so as to be covered with a part of the first maintenance lid 117.

Figure 20:
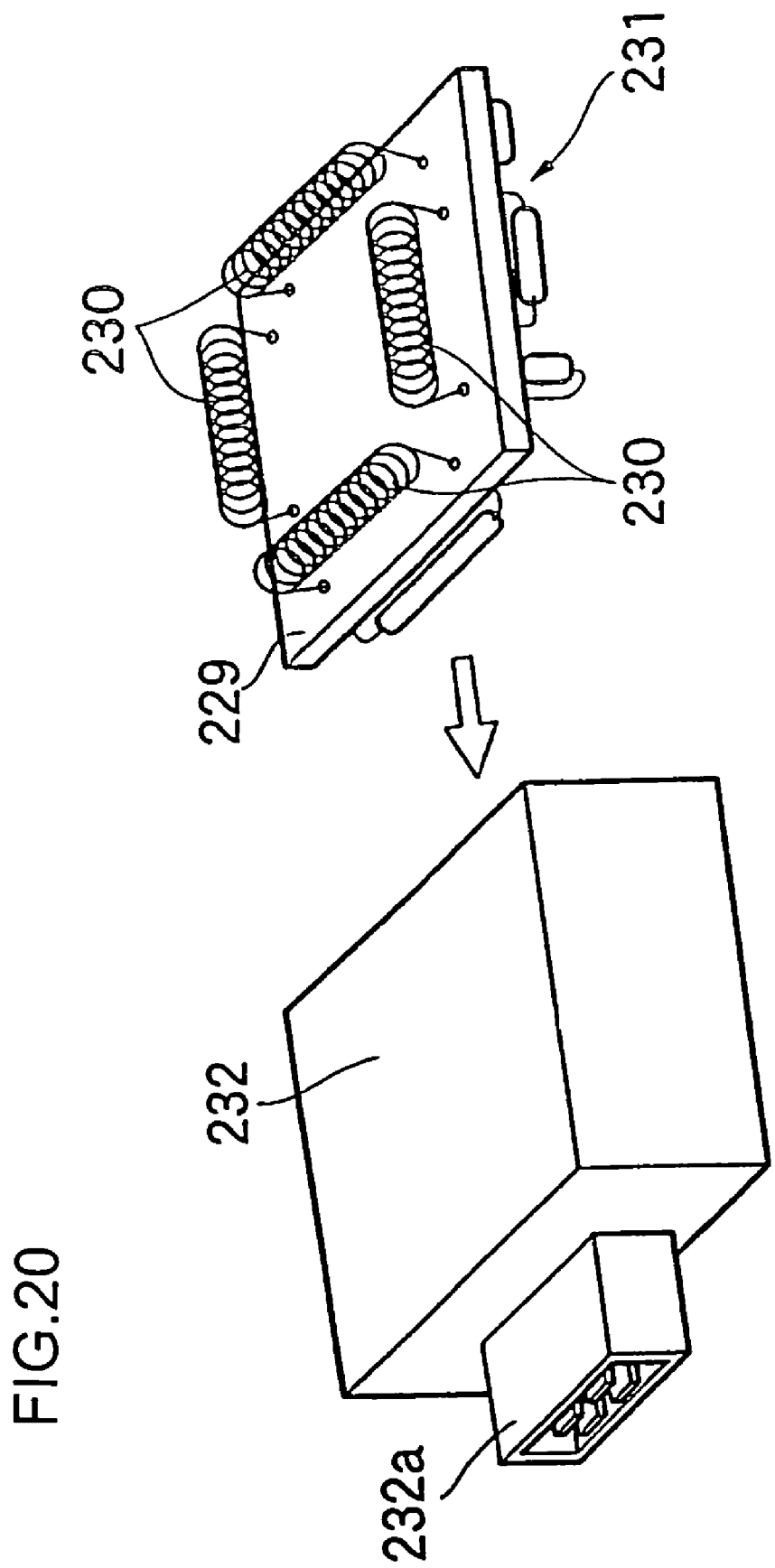
FIG. 20 is an exploded perspective view of a receiver unit.

In FIG. 20, the receiver unit 227 includes a substrate 229 provided on one surface thereof with antennas 230 and on an opposite surface thereof with a receiver circuit 231. The substrate 229 is accommodated in a case 232 integrally provided with a coupler portion 232a.

On the other hand, the transmitting antenna 225 is disposed at a position isolated from the handle lock module 211. In this embodiment, the transmitting antenna 225 is disposed on a center line in the transverse direction of the vehicle and above the handle lock module 211, for example, just under the panel 173 which constitutes a part of the vehicle body cover 34.

Figure 21:
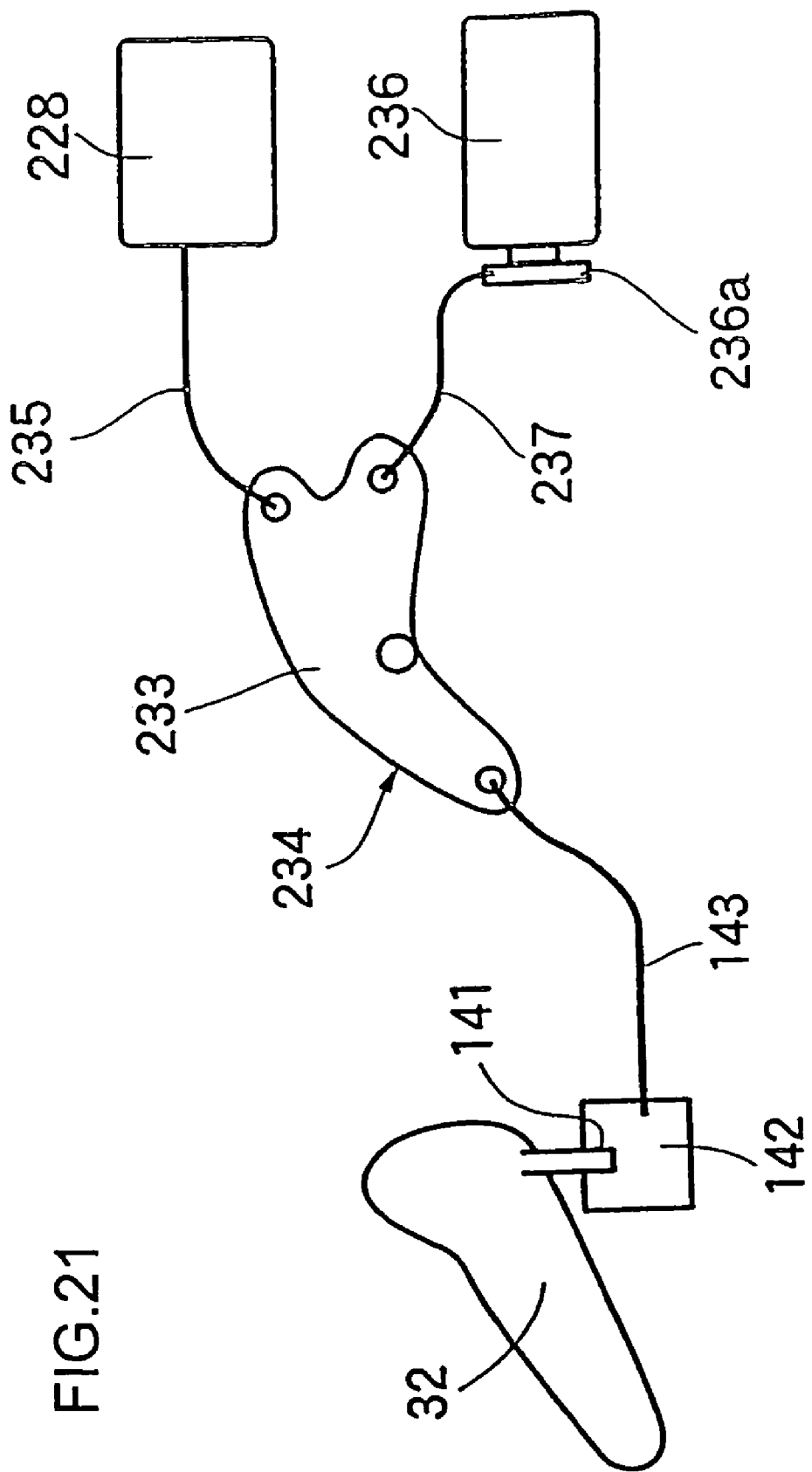
FIG. 21 illustrates a schematic construction of an emergency seat unlocking system.

In FIG. 21, the power transfer cable 143 connected to the seat catcher 142 is connected to one end of a link 233 provided in a link mechanism 234, and the seat lock actuator 228 is connected through a cable 235 to an opposite end of the link 233 so as to pull the power transfer cable 143 and thereby pivot the link 233 upon operation thereof.

A key hole 238 of a key cylinder lock 236 for emergency unlocking is formed in an inner side face on the handle lock module 211 side of the recessed storage portion 214 in the second goods storage portion 192. The key cylinder lock 236 is disposed within the leg shield 158 so as to make the portable transmitter 226 unnecessary and enable at least start-up of the engine E and handle unlocking.

The key cylinder lock 236 for emergency unlocking is provided with a pivoting lever 236a adapted to pivot upon operation of a mechanical key for emergency unlocking inserted into the key hole 238. The pivoting lever 236a is connected to the opposite end of the link 233 through a cable 237.

When the key cylinder lock 236 for emergency unlocking is operated for unlocking, the link 233 is turned so as to pull the power transfer cable 143. Either upon operation of the seat lock actuator 28 or unlocking operation of the key cylinder 236 for emergency unlocking, the link 233 turns so as to pull the power transfer cable 143. Thus, the seat catcher 142 switches from the seat catch condition to the seat catch release condition.

By operating the front seat 32 for opening in response to the seat catch release condition of the seat catcher 142 and by operating a predetermined part disposed within the storage box 30, the control unit 223 assumes the same control mode as in the ID signal receiving mode from the normal portable transmitter 226 and it becomes possible to steer the scooter type vehicle.

The operation of this embodiment will now be described. The rear expanded portion expanded backward beyond the rear end of the rear seat 33 and beyond the support pipe 62 as an upper mounting portion of the rear cushions 64 to the rear portion of the vehicle body frame F is provided in the rear portion of the storage box 30. The storage box 30 has the front helmet storage portion 119, which is disposed under the front seat 32 of the tandem type riding seat 31, and the rear helmet storage portion 120 disposed under the rear seat 33 of the riding seat 31. Therefore, the capacity of the storage box 30 can be increased to the extent that long goods such as gold clubs extending backward beyond the rear end of the riding seat 31 can be accommodated within the storage box 30. Besides, small goods other than helmet can be accommodated in the rear portion of the storage box 30. That is, goods which are seldom used such as tools can be accommodated in the rear portion of the storage box 30.

Moreover, since the rear expanded portion 121 is expanded backward up to about the same position as the rear end of the grab rail 118 which is disposed around the rear seat 33, not only the capacity of the storage box 30 can be increased, but also the rear portion of the storage box 30 can be protected by the grab rail 118.

Since the narrow portion 121a which gets in between the right and left tail light units 123 in top view is provided in the rear portion of the rear expanded portion 121, it is possible to effectively utilize the space formed between the pair of right and left tail light units 123. Therefore, the capacity of the storage boxy 30 is increased. Thus, it becomes easier to form the space for replacing bulbs in the tail light units 123.

The storage box 30 has the upper cover 111 disposed under the rear seat 33, and the storage space 128 capable of being utilized upon removal of the rear seat 33 is formed on the upper surface of the upper cover 111. A space for accommodating small goods can be ensured other than the interior of the storage box 30 while avoiding increase in the number of parts and avoiding structural complication. In addition, the storage space 128 is formed inside the first rib 127 which is erected on the upper cover 111 and continuous in an endless manner, and the second rib 129 which is also continuous in an endless manner so as to form a labyrinth structure in cooperation with the first rib 127 is suspended from the bottom plate 33a of the rear seat 33. Thus, the entry of rain water and dust into the storage space 128 can be prevented by a simple structure.

The lighting unit 116 for lighting the interior of the storage box 30 is attached to an inner side face of the storage box 30 at a portion corresponding to the front portion of the upper cover 111. Because the upper cover 111 is provided, the interior of the rear portion of the storage box 30 which is apt to become dark can be lit without being obstructed by the goods accommodated in the rear portion of the storage box 30. Besides, in the portion corresponding to the front portion of the upper cover 111, the inner side face of the storage box 30 is easy to be seen, and it is possible to easily check the burned-out bulb in the lighting unit 116 easily.

The rear upper cover 165 and the rear center cover 166 which cover the rear expanded portion 121, as well as the pair of right and left tail light units 123 and the rear fender 181 are attached to the rear expanded portion 121. Therefore, plural members disposed around the rear portion of the storage box 30 can be removed at a time by mere removal of wiring of the tail light units 123.

The storage box 30 has the shallow portion 110c located between the front and rear helmet storage portions 119 and 120. The throttle body 68 with the control box 76, which accommodates the controller 75, attached thereto, and the fuel injection valve 74 are disposed under the shallow portion 110c in such a manner that their upper ends are substantially flush with each other. Therefore, the shallow portion 110c located between the front and rear helmet storage portions 119 and 120 can be utilized effectively as a container by forming it flat. Besides, a part of the intake system in the engine E can be disposed effectively in the space formed under the shallow portion 110c.

The lower portion of the rear expanded portion 121 is disposed lower than the upper mounting portion of the rear cushion 64 for mounting to the rear portion of the vehicle body frame F as follows. The raised portion 110d is formed by raising the bottom wall of the storage box 30 partially upward. The raised portion 110d is interposed between the container portion 124 and the rear helmet storage portion 120. The container portion 124 is formed within the rear expanded portion 121. The rear helmet storage portion 120 and the container portion 124 located to the rear of the rear helmet storage portion 120 are partitioned by the raised portion 110d. As a result, not only the ease of use can be ensured, but also longitudinal movements of the small goods accommodated in the rear container portion 124 can be prevented by the raised portion 110d.

The fuel tank 28 which is formed vertically long in side view is disposed in front the storage box 30, and the front expanded portion 122 expanded forward up to near the bottom of the fuel tank 28 is provided in the lower portion of the front end of the storage box 30. Therefore, the front portion of the storage box 30 is formed deeply. The accommodation of long goods is facilitated, and the capacity of the storage box 30 can be increased.

The battery 147 and the other electric appliances 148 to 150 are accommodated in the front expanded portion 122. The battery 147 and the electric appliances 148 to 150 can be stored within the storage box 30 without interfering with the accommodation of the helmet H1 and the like.

Since the second maintenance lid 151 which partitions between the interior of the front expanded portion 122 and the front helmet storage portion 119 is openably mounted to the storage box 30, it is possible to prevent mutual contact and damage between the goods accommodated within the front expanded portion 122 and the helmet H1 accommodated within the front helmet storage portion 119.

Since the lower portion of the vertically extending damper rod 152 is accommodated within the front expanded portion 122 so as to assist the opening and closing operation of the front seat 32, a space for disposing the damper rod 152 need not be ensured outside the storage box 30. Further, when the front seat 32 is opened, exposure of the damper rod 152 to the exterior is avoided as far as possible so as not to be an obstacle to the insertion of goods into the storage box 30 and thus it is possible to improve the appearance and style.

The fuel tank 28 and the radiator 29 are disposed under the front tunnel portion 167 formed by a part of the vehicle body cover 39 which covers the vehicle body frame F. The body frame F includes the head pipe 27, the pair of right and left upper down-frames 37 extending backwardly downward from the head pipe 27, and the pair of right and left lower down-frames 38 having inclined portions 38a which extend backwardly downward from the head pipe 27 at positions below the connection of the upper down-frames 37 to the head pipe 27. The fuel tank 28 extending vertically from behind the lower portion of the head pipe 27 to the lower portions of both lower down-frames 38 is disposed in a space surrounded with both upper down-frames 37 and both lower down-frames 38 and just after the front wheel WF.

Therefore, by disposing the vertically long fuel tank 28 at a position just after the front wheel WF, the portion corresponding to the lower portion of the head pipe 27 is prevented from becoming a dead space and parts can be disposed by effectively utilizing the space under the floor tunnel portion 167. Besides, by approximating the fuel tank 28 which is relatively heavy to the front wheel WF, it is possible to increase the distribution load on the front wheel WF and thereby improve the turning performance. This is advantageous to the suction of the pump in the case where the pump unit 97 is attached to the fuel tank 28 as in this embodiment.

The radiator 29 is disposed behind the fuel tank 28, and the battery 147 is disposed between the radiator 29 and the fuel tank 2. The space behind the fuel tank 28 can be set relatively wide by making the fuel tank 28 long in the longitudinal direction. By disposing the battery 147 as a heavy object centrally in the longitudinal direction of the vehicle body, it is possible to make contribution to the steering performance.

Besides, by disposing the battery 147 between the radiator 29, which radiates heat, and the fuel tank 28, affection of the heat from the radiator 29 can be prevented from the fuel tank 28.

Since the pump unit 97 accommodated within the lower portion of the fuel tank 28 is mounted to the fuel tank 28 from the back side of the fuel tank 28, the pump unit 97 can be mounted to the fuel tank 28 so as not to be influenced by a difference in height of the road surface.

In addition, the pump unit 97 is mounted to the fuel tank 28 in such a posture as its rotational axis is inclined forwardly downward. By approximating the suction port of the pump unit 97 as close as possible to the bottom of the fuel tank 28, it is possible to minimize the amount of dead fuel remaining within the fuel tank 28.

The reservoir tank 104 of the radiator 29 is disposed under the step floor 159 which constitutes a part of the vehicle body cover 34, and the water supply port of the reservoir tank 104 is disposed under the first maintenance lid 117 which is removably secured to the bottom wall of the storage box 30 disposed under the riding seat 31. Thus, by disposing the radiator 29 behind the fuel tank 28, the water supply port 107 of the radiator tank 104 is easy to face the bottom of the riding seat 31. That is, the water supply port 107 can be disposed higher than when it is allowed to face the step floor 159 located just above the reservoir tank 104, whereby the workability in water supply can be improved.

Moreover, the water supply port-forming member 108 which forms the water supply port 107 is supported by the mounting portion 54 for mounting the tension rod 53 to the vehicle body frame F. The tension rod 53 is provided between the vehicle body frame F and the unit swing engine UE which is supported swingably by the vehicle body frame F. The water supply port-forming member 108 can be supported by the vehicle body frame F without the need of giving any special consideration for supporting the water supply port-forming member 108.

The fuel from the fuel tank 28 is fed to the fuel injection valve 74. By using the pump unit 97 attached to the fuel tank 28 which makes the residual fuel level relatively high in a small residual fuel quantity, the fuel present within the fuel tank 28 can be fed effectively to the fuel injection valve 74.

The swing arm 48 disposed on the right side of the rear wheel WR to support the rear wheel WR is formed in a generally triangular shape in side view, and the brake caliper 85 of the rear brake 84 is supported by the swing arm 48. The opening 81 is formed nearly centrally of the swing arm 48, and the brake caliper 85 is disposed within the opening 81. Therefore, it is possible to dispose the brake caliper 85 in a relatively low position to make low the center of gravity of the scooter type vehicle. Further, since the brake caliper 85 is surrounded with the swing arm 48, it is possible to ensure a substantial width in the vertical direction of the swing arm 48. The rigidity in the longitudinal direction and torsional rigidity are enhanced.

Since the exhaust muffler 78 is disposed laterally outside the swing arm 48 so as to cover the brake caliper 85 from laterally outside, it is possible to improve the appearance.

The opening 81 is formed so that its vertical width becomes narrower backward, and the brake caliper 85 disposed in the rear portion of the opening 81 is supported by the swing arm 48 to the rear of the opening 81. The mounting rigidity of the brake caliper 85 can be enhanced by supporting the brake caliper 85 by the portion of the swing arm 48 having high rigidity.

Moreover, the lower portion of the exhaust muffler 78 is clamped to the swing arm 48 at two positions which sandwich the axle 80 of the rear wheel WR from both front and rear.

Between a straight line L joining those clamped portions and the exhaust muffler 78, the axle 80 and the clamped portion of the rear cushion 64 to the swing arm 48 are disposed. The rear cushion 64 is disposed between the swing arm 48 and the vehicle body frame F. Therefore, not only the mounting of the exhaust muffler 78 and the rear cushion 64 to the swing arm 48 is facilitated, but also the axle 80 and the clamped portions are made difficult to be seen from laterally above the scooter type vehicle, whereby it is possible to improve the appearance.

The electric motor 42 for changing the gear ratio of the continuously variable transmission M interposed between the engine E and the rear wheel WR is disposed below the left passenger step 162 provided at the rear portion of the step floor 159 of the vehicle body cover 34. Thus, the electric motor 42 is disposed at a relatively low position, whereby it is possible to make contribution to lowering the center of gravity of the scooter type vehicle.

The continuously variable transmission M is a belt type transmission which constitutes the unit swing engine UE together with the engine E with the axis of the cylinder 45 nearly horizontal, and the electric motor 42 is disposed ahead of the continuously variable transmission M and sideways of the cylinder 45. Therefore, the electric motor 42 can be protected by the cylinder 45 of the engine E and the continuously variable transmission M. Besides, the vehicle body frame F is provided with the support frames 41 which support the step floors 159 from below, and the electric motor 42 is disposed below the support frames 41. Thus, the electric motor 42 can be protected more effectively by the support frames 41 having high rigidity.

Further, since the electric motor 42 is disposed with its rotational axis facing in the direction of the width of the vehicle body, the electric motor 42 can be disposed sideways of the cylinder 45 of the engine E so as not to project laterally outward from the outer side face of the continuously variable transmission M.

The grab rail 118 is attached to the rear portion of the vehicle body frame F, and the back rest 135 is disposed behind the rear seat 33 of the riding seat 31. The back rest 135 is formed in a generally streamline shape in side view having as upper surfaces the front slant surface 135a declining forward and the rear slant surface 135b declining backward. The back rest 135 is secured to the upper surface of the rear portion of the grab rail 118.

Therefore, the waist of a passenger on the rear seat 33 can be held firmly by the forwardly declining front slant surface 135a out of the upper surfaces of the back rest 135. Besides, since the back rest 135 is in a generally streamline shape in side view, it is possible to improve the appearance of the back rest 135 and improve the aerodynamic performance. Moreover, since the backwardly declining rear slant surface 135b out of the upper surfaces of the back rest 135 can be utilized, goods protruding backward from the rear seat 33 can be put on the back rest 135.

Since the back rest 135, when seen in top view, is formed so that the width thereof becomes gradually narrower backward, the back rest 135 can be formed compact and it is possible to not only ensure the cooperativeness of design, coupled with the shape of the vehicle body cover 34, but also improve the aerodynamic performance.

The rear upper surface of the grab rail 118 is set nearly flush with the upper surface of the rear seat 33, and the back rest 135 is attached removably to the rear upper surface of the grab rail 118. Therefore, when a larger number of goods are to be put on the rear seat 33, the rear upper surface of the grab rail 118 after removal of the back rest 135 can be utilized effectively for placing goods thereon.

In the leg shield 158 of the vehicle body cover 34, the first goods storage portion 191 and the second goods storage portion 192 are disposed dividedly right and left. The first goods storage portion 191 is constituted as a drawer type having the storage case 193 capable of being drawn out and removed from the leg shield 158. In the second goods storage portion 192, the recessed storage portion 214 formed in the leg shield 158 is openably covered with the lid member 215 hinged to the leg shield 158. Thus, the relatively wide space of the leg shield 158 can be utilized effectively for accommodating goods therein. Besides, since the storage case 193 is formed larger than the recessed storage portion 214, a relatively large quantity of goods can be accommodated in the first goods storage portion 191. In this connection, since the first goods storage portion 191 is a drawer type, there is no fear that the goods present inside the storage case 193 may go out when the lid is opened. Thus, goods can be accommodated fully in the interior of the storage case 193. Moreover, a relatively large opening 196 can be formed in the leg shield 158 by removing the storage case 193 from the leg shield 158, whereby it is possible to facilitate maintenance of the bulbs 171a of the head lights 171 disposed ahead of the first goods storage portion 191.

Between the storage case 193 of the first goods storage portion 191 and the leg shield 158, the lock mechanism 208, which permits switching between connection and disconnection of the storage case 193 to and from the leg shield 158, is disposed. The switching is performed in accordance with a key operation from the key hole 207 facing the front side of the storage case 193. The storage case 193 can be drawn out by inserting a key into the key hole 207 of the lock mechanism 208 and operating it, whereby the goods accommodated in the first goods storage portion 191 can be prevented from being stolen. Besides, since the storage case 193 can be drawn out using the key as a knob, it is not necessary to provide the storage case 193 with a knob, and a larger number of goods can be accommodated in the first goods storage portion 191.

Moreover, since the storage case 193, in a retracted state thereof, covers the head pipe 27 from either the right or the left side and the lock mechanism 208 is disposed at a position opposed to the head pipe 27 from behind the head pipe, the capacity of the storage case 193 can be set larger by effectively disposing the lock mechanism 208 in the space formed behind the head pipe 27.

The handle lock module 211 which can make the steering handle 26 inoperative is disposed near the head pipe 27 on the side opposite to the first goods storage portion 19. The handle lock module 211 formed to be sandwiched between the first goods storage portion 191 and the second goods storage portion 192. The first goods storage portion 191, the handle lock module 211, and the second goods storage portion 192 can be arranged side by side, whereby the relatively wide space of the leg shield 158 can be utilized effectively.

Since the transmitting antenna 225 is disposed at a position isolated from the handle lock module 211, it is possible to enhance the degree of layout freedom of the transmitting antenna 225.

Since the receiver unit 227 is disposed within the storage box 30 or within the riding seat 31 and in this embodiment it is disposed within the storage box 30, it is possible to ensure a satisfactory environment resistance of the receiver unit 27 against mud, dust, water, and external forces while making it unnecessary to coat the receiver unit 227 with a coating material of a synthetic resin. Thus, waterproofness can also be ensured while making readjustment of the receiver unit 227 unnecessary.

The receiver unit 227 includes the substrate 229 accommodated within the case 232, with antennas 230 being disposed on one surface of the substrate 229 and the receiver circuit 231 provided on the opposite surface of the substrate. Thus, the receiver unit 227 can be constituted compact, and the space necessary for disposing the receiver unit 227 in the storage box 30 can set as small as possible.

The first maintenance lid 117 for performing maintenance associated with the engine E disposed under the storage box 30 is openably provided in the bottom wall of the storage box 30. The receiver unit 227 is disposed within the storage box 30 so as to be covered with part of the first maintenance lid 117. Therefore, the receiver unit 227 can be disposed at a position suitable for maintenance while preventing interference with the goods accommodated in the storage box 30.

The key cylinder lock 236 for emergency unlocking which enables at least start-up of the engine E and unlocking of the handle while making the portable transmitter 226 unnecessary is disposed within the leg shield 158. Therefore, even if the user of the vehicle loses the portable transmitter 226 or the battery life of the portable transmitter 226 runs down, the scooter type vehicle can be allowed to run by operating the emergency unlocking key cylinder lock 236 with the emergency unlocking mechanical key.

Moreover, the second goods storage portion 192 is provided in the leg shield 158 on the right side of the handle lock module 211, and the key hole 238 of the key cylinder lock 236 for emergency unlocking faces the inner side face of the recessed storage portion 214 in the second goods storage portion 192. The recessed storage portion 214 is normally closed by the lid member 215. Therefore, by disposing the key hole 238 in an inconspicuous place, the key hole 238 of the key cylinder lock 236 for emergency unlocking can be prevented from mischief as far as possible.

The seat catcher 142 switches between the seat catch condition and the seat catch release condition. The seat catch condition keeps the front seat 32 closed. The front seat 32 is able to open the storage box 30. The seat catch release condition permits opening and closing of the front seat 32. The link mechanism 234 connected to the seat catcher 142 is connected to the seat lock actuator 228 which operates in accordance with operation performed upon receipt of a signal from the normal portable transmitter 226 and is also connected to the cylinder lock 236 for emergency unlocking. Therefore, by using the link mechanism 234 for actuating the seat catcher 142 in common to both the case where the portable transmitter 226 is effective and the case where the cylinder lock 236 for emergency unlocking is used, it is possible to reduce the number of parts.

Although an embodiment of the present invention has been described above, the present invention is not limited to the above embodiment, but various design changes may be made without departing from the gist of the invention described in the claims.

For example, the present invention is also applicable to other motorcycles than the scooter type vehicle.

We claim:

1. A luggage storage device for a motorcycle having a vehicle body frame, a rear wheel, a rear cushion, and a tandem riding seat comprising:
    a storage box comprising a front helmet storage portion disposed under a front seat of the tandem riding seat, a rear helmet storage portion disposed under a rear seat of the tandem riding seat, and a rear expanded portion expanded backward beyond a rear end of the rear seat up to right and left tail light units, and a narrow portion formed centrally and extending rearwardly from the rear expanded portion so as to fit between said right and left tail light units;
    wherein the storage box is disposed under the tandem riding seat so as to extend from under a front end of the tandem riding seat up to near an upper portion of the rear cushion which suspends the rear wheel from a rear portion of the vehicle body frame.

2. The luggage storage device for a motorcycle according to claim 1, wherein the rear expanded portion is expanded backward up to approximately the same position as a rear end of a grab rail disposed around the rear seat.

3. The luggage storage device for a motorcycle according to claim 1, wherein the storage box further comprises an upper cover having a top surface disposed under the rear seat, and an upper cover storage space defined by the top surface of the upper cover.

4. The luggage storage device for a motorcycle according to claim 3, further comprising a first rib disposed on the upper cover and extending in an endless manner and defining an upper cover storage space, and a second rib disposed on a bottom plate of the rear seat and extending in an endless manner, the first rib and the second rib forming a labyrinth structure.

5. The luggage storage device for a motorcycle according to claim 3, further comprising a lighting unit attached to an inner side face of the storage box.

6. The luggage storage device for a motorcycle according to claim 1, wherein cover members constituting a part of a vehicle body cover, said pair of right and left tail light units, and a rear fender, are attached to the rear expanded portion.

7. The luggage storage device for a motorcycle according to claim 1, the storage box comprising a shallow portion located between the front helmet storage portion and the rear helmet storage portion, wherein a throttle body with a control box attached thereto, the control box containing a controller, and a fuel injection valve are disposed under the shallow portion such that upper ends of the throttle body and the fuel injection valve are substantially flush with each other.

8. A luggage storage device for a motorcycle having a vehicle body frame, a rear wheel, a rear cushion, and a tandem riding seat comprising:
    a storage box comprising a front helmet storage portion disposed under a front seat of the tandem riding seat, a rear helmet storage portion disposed under a rear seat of the tandem riding seat, and a rear expanded portion provided in a rear portion of the storage box expanded backward beyond an upper mounting portion of the rear cushion; and
    a container portion disposed within the rear expanded portion, a lower portion of the rear expanded portion disposed lower than the upper mounting portion of the rear cushion, and a raised portion defined by a bottom wall of the storage box interposed between the container portion and the rear helmet storage portion;
    wherein the storage box is disposed under the tandem riding seat so as to extend from under a front end of the tandem riding seat up to near an upper portion of the rear cushion which suspends the rear wheel from a rear portion of the vehicle body frame.

9. A motorcycle comprising:
    a vehicle body frame;
    a rear cushion operably connected to the vehicle body frame;
    a rear wheel operably connected to the rear cushion;

a tandem riding seat operably connected to the vehicle body frame, the tandem riding seat comprising a front seat and a rear seat;

a luggage storage device comprising a storage box, the storage box comprising a front helmet storage portion disposed under the front seat, a rear helmet storage portion disposed under the rear seat, and a rear expanded portion expanded backward beyond a rear end of the rear seat up to right and left tail light units, and a narrow portion formed centrally and extending rearwardly from the rear expanded portion so as to fit between said right and left tail light units; and a grab rail disposed around the rear seat, wherein the rear expanded portion is expanded backward to approximately the same position as a rear end of the grab rail.

10. The motorcycle of claim 9, the storage box further comprising an upper cover having a top surface disposed under the rear seat and an upper cover storage space defined by the top surface of the upper cover.

11. The motorcycle of claim 9, further comprising a first rib disposed on the upper cover and defining an upper cover storage space, and a second rib suspended from a bottom plate of the rear seat, the first rib and the second rib forming a labyrinth structure.

12. The motorcycle of claim 9, further comprising a vehicle body cover, the vehicle body cover comprising a plurality of cover members attached to the rear expanded portion, said pair of right and left tail light units attached to the rear expanded portion, and a rear fender attached to the rear expanded portion.

* * * * *